United States Patent [19]
Akiyama et al.

[11] Patent Number: 5,265,078
[45] Date of Patent: Nov. 23, 1993

[54] DISK MAGAZINE AND DISK LOADING DEVICE

[75] Inventors: Yoshiyuki Akiyama; Nobuyuki Hara, both of Kanagawa, Japan

[73] Assignee: Sony Corporation, Tokyo, Japan

[21] Appl. No.: 904,963

[22] Filed: Jun. 26, 1992

Related U.S. Application Data

[62] Division of Ser. No. 444,142, Oct. 27, 1989.

[30] Foreign Application Priority Data

| | | |
|---|---|---|
| Mar. 7, 1988 [JP] | Japan | 63-53178 |
| Aug. 16, 1988 [JP] | Japan | 63-203562 |

[51] Int. Cl.⁵ ........................................... G11B 17/22
[52] U.S. Cl. ...................... 369/36; 369/38; 369/192; 360/98.06
[58] Field of Search ............ 369/34, 38, 36, 270, 369/291, 77.2, 191, 192; 360/98.06

[56] References Cited

U.S. PATENT DOCUMENTS

| | | |
|---|---|---|
| 4,671,469 | 6/1987 | Ikebe et al. |
| 4,701,900 | 10/1987 | Hasegawa et al. ........... 369/39 X |
| 4,737,945 | 4/1988 | Yamazaki et al. ........... 369/36 |
| 4,841,499 | 6/1989 | Takahashi et al. |
| 4,864,551 | 9/1989 | Tomita et al. |

FOREIGN PATENT DOCUMENTS

| | | |
|---|---|---|
| 0225766 | 6/1987 | European Pat. Off. ........... 369/36 |
| 0225766 | 5/1988 | European Pat. Off. |
| 0217393 | 12/1988 | European Pat. Off. |
| 58-60460 | 4/1983 | Japan . |
| 60-13381 | 1/1985 | Japan . |
| 60-194748 | 12/1985 | Japan . |
| 61-94288 | 5/1986 | Japan . |
| 61-134977 | 6/1986 | Japan ........................... 369/291 |
| 61-229283 | 10/1986 | Japan . |
| 2160349A | 5/1985 | United Kingdom . |

OTHER PUBLICATIONS

IBM Technical Disclosure Bulletin vol. 26, No. 3A, Aug. 1983, pp. 1208-1209 "Magnetic Disk Container", W. H. Backman & G. D. Erickson.

Primary Examiner—Stuart S. Levy
Assistant Examiner—Joseph A. Rhoa
Attorney, Agent, or Firm—Hill, Steadman & Simpson

[57] ABSTRACT

A disk magazine (1) for containing a plurality of disks (8) includes a detachable lid (4) for covering its disk outlet (2), enabling to take out the disks, a plurality of disk-pushing means (6) for pushing out the disks (8) one by one through the outlet (2). This prevents dust from entering or disks from popping out the magazine when the disk magazine (1) is not in use. A compact recording/reproducing apparatus provided detachably with the disk magazine (1) can be constructed if a single motor (85) is used to drive a pushing lever (87) for selectively thrusting the disk pushing means (6) to selectively push said disk (8) out of the disk magazine (1), and disk transfer means for loading the pushed disk (8) onto, or unloading it from, the recording/reproducing drive unit. A pushing lever (87) is connected to a press piece (107) which pushes portions (11a) of magazine slide levers (11) to be pushed, thereby causing discs to be pushed out of the magazine (1).

14 Claims, 19 Drawing Sheets

DISK MAGAZINE AND DISK LOADING DEVICE

This is a division of application Ser. No. 444,142, filed Oct. 27, 1989.

TECHNICAL FIELD

The present invention relates to a disk magazine in which recording and/or reproducing disks such as optical magnetic disks are housed in a vertically stacked state, and to a disk loading device of a recording/reproducing apparatus for selectively loading the housed disks in a recording/reproducing drive unit so as to perform a recording/reproducing operation.

BACKGROUND ART

Magnetic disks, optical disks, optical magnetic disks, and the like are currently available as recording and/or reproducing disks. Of these disks, optical disks and optical magnetic disks normally allow rewrite, i.e., overwrite of recorded contents. However, optical disks in which signals are recorded as pits are generally used as playback disks.

Such disks have been used by various types of recording/reproducing apparatuses. One of these apparatuses employs a so-called automatic changer system. In this system, a plurality of disks are directly housed in a disk magazine without being housed in cassette cases, and a disk is arbitrarily selected and taken out from the magazine to be loaded in a recording/reproducing drive unit, thereby performing a recording or reproducing operation. For example, a CD player of an automatic disk change system is designed in this manner. As a recording/reproducing apparatus using such a disk magazine, attempts have been made to develop an apparatus of a system in which a plurality of recording/reproducing drive units are arranged and disks are taken out from a disk magazine so as to be respectively loaded in the recording/reproducing drive units so that data can be simultaneously or selectively recorded or reproduced in or from the disks. For example, a disk player as an external storage unit in a computer system is being developed.

FIG. 16 shows a conventional disk magazine A used for such a recording/reproducing apparatus.

Referring to FIG. 16, reference symbol B denotes an outer casing having a rectangular shape as a two-dimensional figure. In addition, the outer casing B has a box-like shape with an open front surface C, while elongated holes E are formed in one side wall D so as to extend in the forward/backward direction at substantially equal intervals in the height direction. Reference symbols F denote partition plates arranged at substantially equal intervals in the height direction. The interior of the outer casing B is partitioned into a plurality of disk housing spaces G by these partition plates F. The elongated holes E respectively correspond to the disk housing spaces G. Disks H are respectively housed in the disk housing spaces G one by one. The disks H are held by an elastic member (not shown) located near a wall opposite to the disk housing spaces G so as not to slip out of the disk housing spaces G. Reference symbols I denote disk push levers (partially shown) respectively arranged in the disk housing spaces G. Operation arms J of the disk push levers I respectively protrude from the wall D through the holes E, and are supported to be freely moved forward and backward within a predetermined range. In addition, the operation arms J are normally biased backward by an elastic member (not shown), so that while they are not biased forward, they are held at a position indicated by solid lines.

The above-described disk magazine A is mounted on a disk magazine mounting portion of a disk player (not shown) in a predetermined direction. When a disk push lever I corresponding to a designated disk H is moved forward as indicated by alternate long and two short dashed lines in FIG. 16 by a disk loading mechanism, the designated disk H is pushed so that it partially protrudes from the opening C. The disk H pushed out in this manner is taken out by a disk transfer means of the disk loading mechanism and is loaded in a recording/reproducing drive unit.

When another disk H is designated or an ejection command of the disk magazine A is performed, the disk H which is loaded in the recording/reproducing drive unit in the above-described manner is returned into a predetermined disk housing space G of the disk magazine A by the disk loading mechanism.

In a read operation of signals from a magnetic disk or an optical magnetic disk, if dust adheres to a recording surface or the surface is damaged, that part of the signal may drop out.

Since the opening C for ejecting disks of the conventional magazine A is always open, and moreover a large number of holes E are formed to allow the disk push levers I and the arms J to protrude from the magazine, dust and the like tend to enter the magazine through the opening C and the holes E and adhere to the disks H.

DISCLOSURE OF THE INVENTION

In order to solve the above-described problem, a disk magazine of the present invention comprises a pivotal lid for opening and closing a disk ejecting opening, and a plurality of disk push means having portions (to be depressed) which are placed near the disk ejecting opening and are depressed to cause disks to protrude by a predetermined amount.

With this arrangement, while the disk magazine is not attached to the recording/reproducing apparatus, the disk ejecting opening can be sealed by the lid. In addition, when the disk ejecting opening is open, the portions (to be depressed) of the disk push means are caused to externally protrude from the magazine so that an operation of the disk push means can be performed. Therefore, the portions (to be depressed) of the disk push means need not externally protrude from the magazine. With this arrangement, the disk magazine can be almost completely sealed while no disk is used. This can prevent dust and the like from entering the magazine and reliably prevent disks from accidentally slipping out from the magazine.

If a disk magazine is designed in the above-described manner, the disk push means must be depressed in front of the disk ejecting opening of the disk magazine.

For this reason, in a disk loading apparatus of a recording/reproducing apparatus using such a disk magazine, means for depressing the disk push means of the disk magazine may be constituted by, e.g., a proper press lever supported to be moved within a predetermined range in a direction parallel to the loading direction of the disk magazine, and an electromagnetic plunger mechanism or the like for moving the press lever. In this arrangement, only during loading, the press lever is moved to the disk magazine side.

In this arrangement, however, driving systems for actuating a disk push means of the disk magazine and for driving a disk transfer means for transferring a disk pushed out from the disk magazine to a recording/reproducing drive unit are independently arranged even though both the systems serve as driving systems for disk loading. As a result, the number of parts is inevitably increased. Therefore, various problems are posed, e.g., a complicated structure and an increase in cost and size. In addition, this arrangement requires a control means or the like for controlling operation timings between the two drive systems.

In order to solve the above-described problem, according to the present invention, there is provided a disk loading apparatus comprising an opening/closing mechanism, attached to the recording/reproducing apparatus, for opening/closing the lid of the disk magazine, one motor to be rotated in a forward direction during loading of the disk and to be rotated in a reverse direction during unloading, a driving gear to be rotated in forward and reverse directions by the motor, an engaging portion formed projecting on the driving gear, a press lever, designed to be freely moved within a predetermined range, for selectively depressing portions (to be depressed) of the disk push means using press portions, clutch means for engaging/disengaging the engaging portion of the driving gear with/from the press lever, and disk transfer means which is rotated in a forward direction upon forward rotation of the motor so as to load the disk, which is pushed out of the disk magazine by the disk push means, in a recording/reproducing drive unit and which is rotated in a reverse direction upon reverse rotation of the motor so as to unload the disk from the recording/reproducing drive unit and to transfer the disk to the disk magazine.

With this arrangement, the following two operations can be performed using one motor: pushing a disk out of the disk magazine by depressing the disk push means of the disk magazine using the press lever; and loading/unloading the disk pushed out of the disk magazine in/from the recording/reproducing drive unit by using the disk transfer means. In addition, since control required for the press lever, i.e., controlling the press lever to depress the disk push means only during loading and not to depress the disk push means during unloading, can be performed by one clutch means, the number of parts can be decreased, thus realizing a low-cost, compact apparatus.

BRIEF DESCRIPTION OF THE DRAWINGS

FIGS. 1 to 5 show a disk magazine according to an embodiment of the present invention, in which FIG. 1 is a sectional view taken along a line I—I in FIG. 3, FIG. 2 is a perspective view showing a state wherein a lid is moved to a position to open a disk ejecting opening of a magazine body, FIG. 3 is a sectional view taken along a line III—III in FIG. 1, FIG. 4 is an exploded perspective view showing a portion other than a bottom plate portion, and FIG. 5 is a perspective view showing a bottom plate, a lock slider, and the like; FIGS. 6 to 14 show a disk loading apparatus according to an embodiment of the present invention, in which FIG. 6 is a perspective view showing the outer appearances of a recording/reproducing apparatus and a disk magazine, FIG. 7 is a partial enlarged sectional view taken along a line VII—VII in FIG. 6, FIG. 8 is a sectional view taken along a line VIII—VIII in FIG. 7, FIG. 9 is an enlarged plan view showing a main part of the disk loading apparatus, FIG. 10 is an exploded, enlarged perspective view showing a main part of the disk loading apparatus, FIG. 11 is an enlarged side view showing an opening/closing mechanism of a lid of a disk magazine, FIG. 13 is a partially enlarged side view for explaining a disk unloading operation.

BEST MODE OF CARRYING OUT THE INVENTION

A disk magazine and a disk loading device according to embodiments of the present invention will be described below in detail with reference to the accompanying drawings.

An embodiment in which a disk magazine of the present invention is applied to an optical magnetic disk magazine will be described below first with reference to FIGS. 1 to 5.

Figure 1:
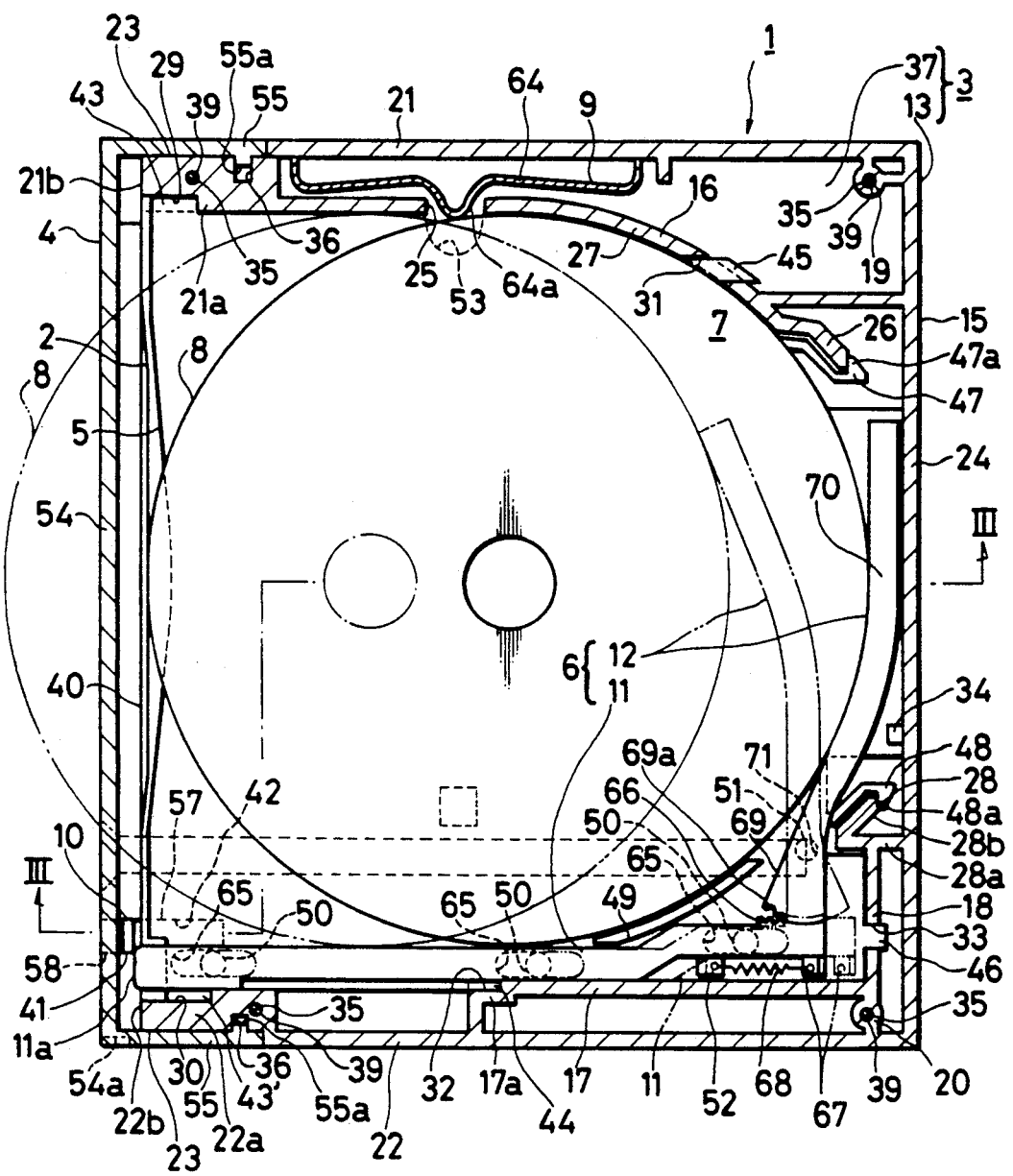
Figure 2:
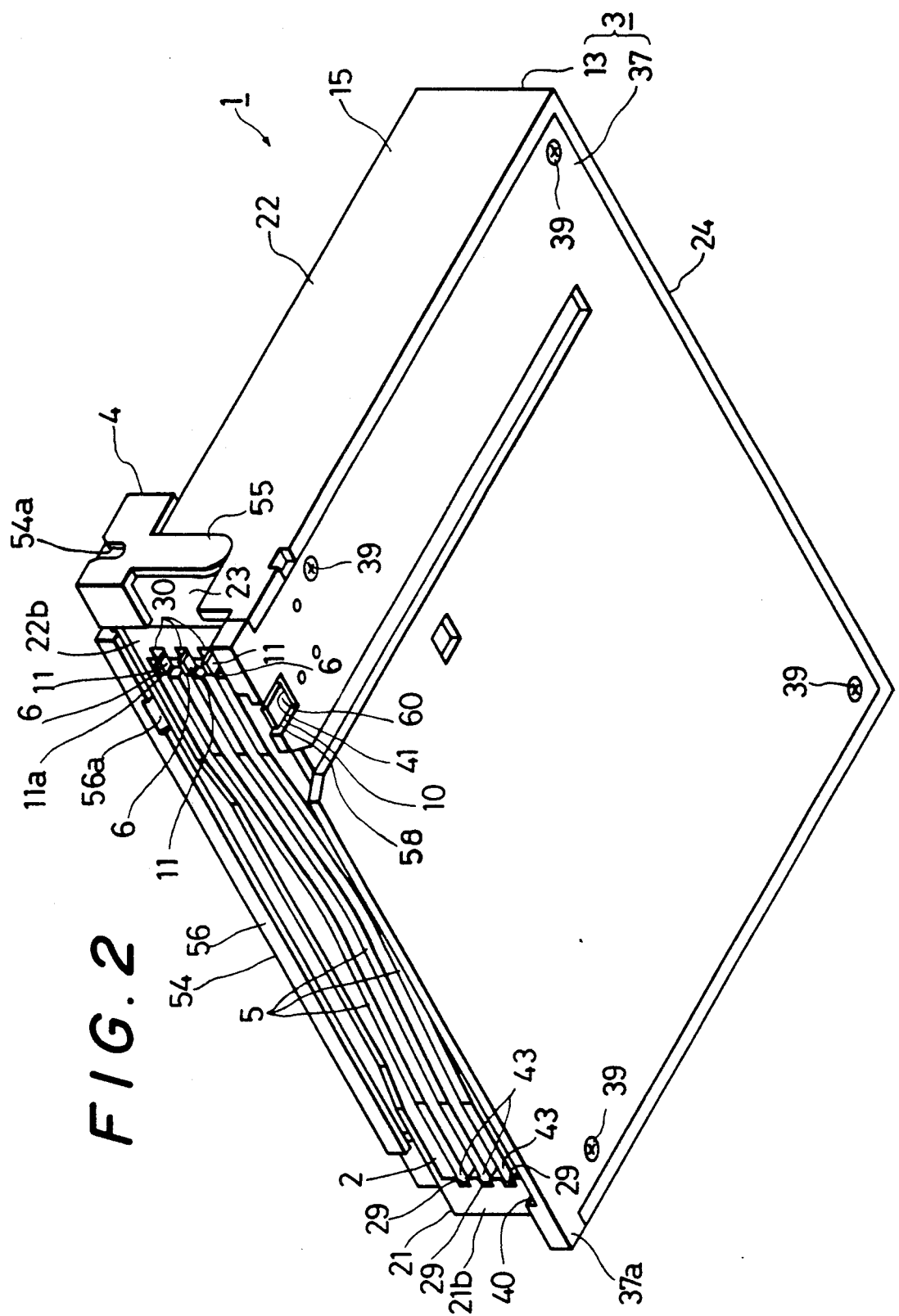
Figure 3:
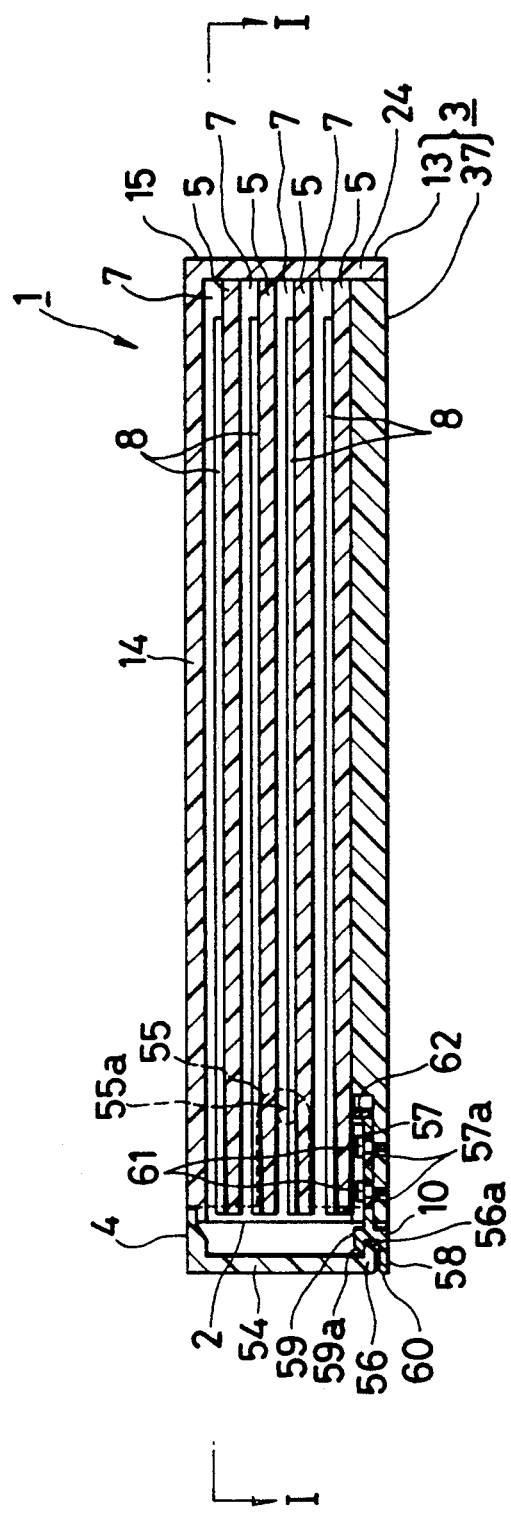

A disk magazine 1 comprises a substantially box-like magazine body 3 having a large opening 2 formed in its front surface (The left and right sides in FIG. 1 are respectively assumed to be front and rear sides, and the upper and lower sides in FIG. 1 are respectively assumed to be left and right sides. The directions which will be indicated in the description on the disk magazine 1 are based on these assumptions.), a lid 4 pivotally supported by the magazine 3 so as to open/close the opening 2, four partition plates 5 which are respectively arranged in the magazine body 3 at predetermined intervals in the height direction, four disk push means 6, and the like. The magazine body 3 is partitioned into four thin spaces 7 (to be referred to as disk housing spaces hereinafter) by the partition plates 5 and the like. Optical magnetic disks 8 as recording and/or reproducing disks are respectively housed in these four disk housing spaces 7 one by one so as to be freely taken out and inserted. These optical magnetic disks 8 are held by a disk hold spring 9 located at the left end portion in the magazine body 3 so as not to be easily moved to the outside of the magazine.

The lid 4 is pivotally supported by the magazine body 3 so as to be moved between an opening position at which the opening 2 is open and a closing position at which the opening is closed. While the lid 4 is set at the closing position, it is locked by a lock slider 10 as a lock means located at the lower end portion in the magazine body 3. When the disk magazine 1 is attached to a disk magazine mounting portion of a recording/reproducing apparatus (to be described later), the above lock is released, and the lid is moved to the opening position.

The disk push means 6 comprise slide levers 11 which are respectively arranged in the four disk housing spaces 7 and supported to freely slide forward and backward, and pivot arms 12 (only the uppermost arm is shown) which are supported to be pivotal in substantially forward and backward directions and have proximal end portions respectively meshed with the rear end portions of the slide levers 11. Front end faces 11a (to be referred to portions to be depressed) of the side levers 11 are located near the opening 2 of the magazine body 3 so as to face forward. When the slide levers 11 are depressed backward, the pivot arms 12 are moved from a position indicated by solid lines in FIG. 1 (to be referred to as a non-push position) to a position indicated by alternate long and two dashed lines in FIG. 1 (to be referred to a push position). With this operation, the pivot arm 12 pushes the optical magnetic disk 8 out of the case 1 by a predetermined amount as indicated by an alternate long and two short dashed line in FIG. 1, i.e., part of the optical magnetic disk 8 forward from the opening 2. Note that depression of the slide levers 11 is performed by a disk loading apparatus of a recording-/reproducing apparatus to be described later.

The magazine body 3 comprises a main body and a bottom plate.

Reference numeral 13 denotes a main body constituting the most part of the magazine body 3. The components of the main body 13 are made of a synthetic resin and integrally formed.

More specifically, the main body 13 is constituted by the following components which are integrally formed with each other: a substantially rectangular top plate 14, an outer wall 15 extending downward from the left and right edges and the rear edge of the top plate 14; three inner walls 16, 17 and 18 perpendicularly extending from the lower surface of the top plate 14, bosses 19 and 20 for attaching the bottom plate, and the like.

The length of the top plate 14 in the right/left direction is slightly larger than that in the forward/backward direction. The length of the top plate 14 in the forward-/backward direction is slightly larger than the diameter of each optical magnetic disk 8. Front end portions 21a and 22a of left and right side portions 21 and 22, i.e., left and right walls 21 and 22 have larger thickness than the remaining portions of the left and right walls 21 and 22 such that the inner surfaces of the front end portions 21a and 22a are located inwardly from the inner surfaces of the remaining portions. Lid mounting notches 23 are respectively formed in the outer surfaces of the thick portions 21a and 22a. The lid mounting notches 23 have upper ends reaching the upper surface of the top plate 14 and front ends reaching front end faces 21b and 22b of the side walls 21 and 22, respectively. In addition, the lower ends of the inner walls 16, 17, and 18 extend to a position slightly higher than the lower end of the outer wall 15.

Of the three walls 16, 17 and 18, the left inner wall 16 located near the left side wall 21 has a front end continuously formed with the rear end of the thick front end portion 21a of the left side wall 21, and has a rear end extending near a rear wall 24, i.e., a rear portion of the outer wall 15. In addition, a spring mounting notch 25 is formed in the inner wall 16 at a position slightly shifted forward from the middle portion in the forward/backward direction. A portion of the inner wall 16 located on the front side from the notch 25 extends parallel to the left side wall 21. A portion 27 between a position located slightly shifted backward from the notch 25 and a rear end portion 26 is curved to extend in the form of an arc with a point located at the central portion of the top plate 14 serving as the center. The rear end portion 26 extends in the form of an L shape from the read end of the arcuated portion 27 substantially backward obliquely right. The right inner wall 17 located near the right side wall 22 has a gap between itself and the right side wall 22, and extends parallel to substantially the rear half of the right side wall 22. In addition, the right side surface of a front end portion 17a is made thick so as to allow the right side surface of the front end portion 17a to be located closer to the right side than the right side surface of the remaining portion. The remaining inner wall 18 has a gap between itself and a ¼ right side portion of the rear wall 24 and extends parallel thereto.

Reference numeral 28 denotes a partition plate locking portion constituted by a portion 28a protruding forward at substantially the middle position between the middle and the right end of the rear wall 24 in the right/left direction, and a portion 28b protruding substantially backward obliquely left from the front end of the portion 28a.

Reference numerals 29 denote partition plate support recesses formed in the inner surface of the front end portion 21a of the left side wall 21; 30, partition plate support recesses formed in the inner surface of the front end portion 22a of the right side wall 22; 31, partition plate support holes formed in the arcuated portion 27 of the inner wall 16; 32, partition plate support recesses formed in the inner surface of the thick front end portion 17a of the right inner wall 17; 33, partition plate holes formed in the inner wall 18; and 34, partition plate support projections extending from the inner surface of the rear wall 24. These partition plate support recesses 29, 30 and 32, the partition plate support holes 31 and 33, and the partition plate projections 34 are arranged four each at equal intervals in the height direction. Of the partition plate support recesses 29, 30, and 32 and the partition plate support holes 31 and 33, those arranged at the same order are at the same height, and those at the uppermost positions are located to define a predetermined gap between themselves and the top plate 14. In addition, the partition plate support projections 34 are arranged at positions respectively corresponding to portions between the support recesses 29 and the like.

The two bosses 19 and 20 are arranged at two corner portions of the rear side in the main portion 13, and tapping lower holes 35 are respectively formed in the lower surfaces of the bosses 19 and 20 and the thick front end portions 21a and 22a of the left and right side walls 21 and 22.

Lid support holes 36 are respectively formed in the front end portions 21a and 22a of the left and right side walls 21 and 22 at positions corresponding to the corner portions near the rear ends of the lower end portions of the lid mounting notches 23.

Reference numeral 37 denotes a bottom plate of the magazine body 3. The bottom plate 37 has a substantially rectangular plate-like shape. Most of the bottom plate 37 except for a front end portion 37a is tightly fitted in the lower end portion of the main portion 13, i.e., portions between the lower end faces of the inner walls 16, 17 and 18 and of the bosses 19 and 20, and the lower end face of the outer wall 15. At the same time, screws 39 extending through screw through holes 38 formed near the periphery of the bottom plate 37 are threadably engaged with the tapping lower holes 35 so as to fix the bottom plate 37 to the magazine body 3 having an opening in only its front surface. A front end face 37a extends forward from the front surface of the main portion 13.

A notch 40 is formed in a portion of the front end upper surface of the bottom plate 37 except for both the end portions. A U-shaped notch 41 is formed in the right end portion of the notch 40. In addition, a substantially L-shaped slider mounting recess 42 is formed in a corner portion of the right front end of the upper surface of the bottom plate 37. The front end of a portion 42a of the slider mounting recess 42 extending along the forward/backward direction is continuous with the notch 41.

Figure 4:
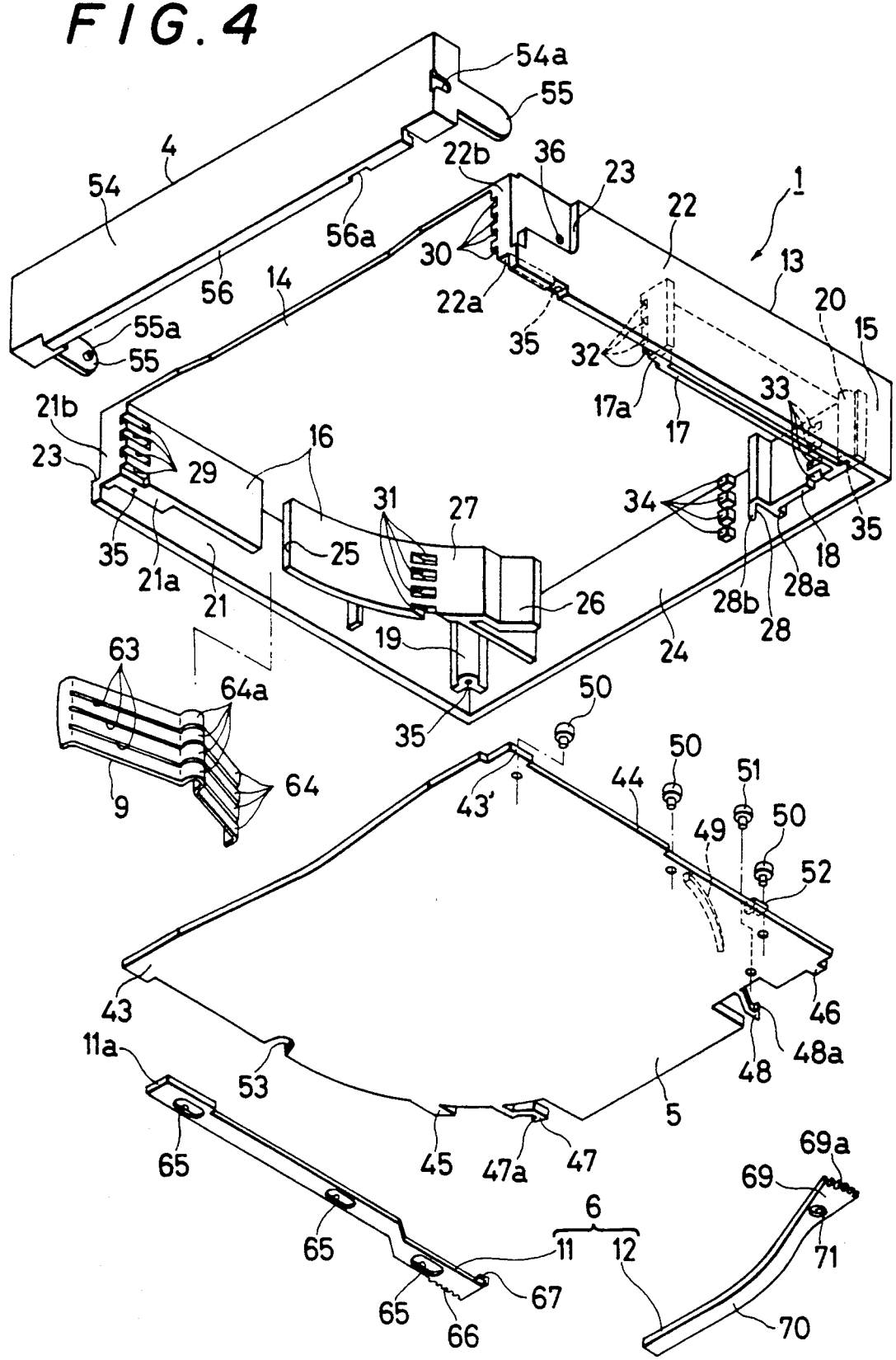
Figure 5:
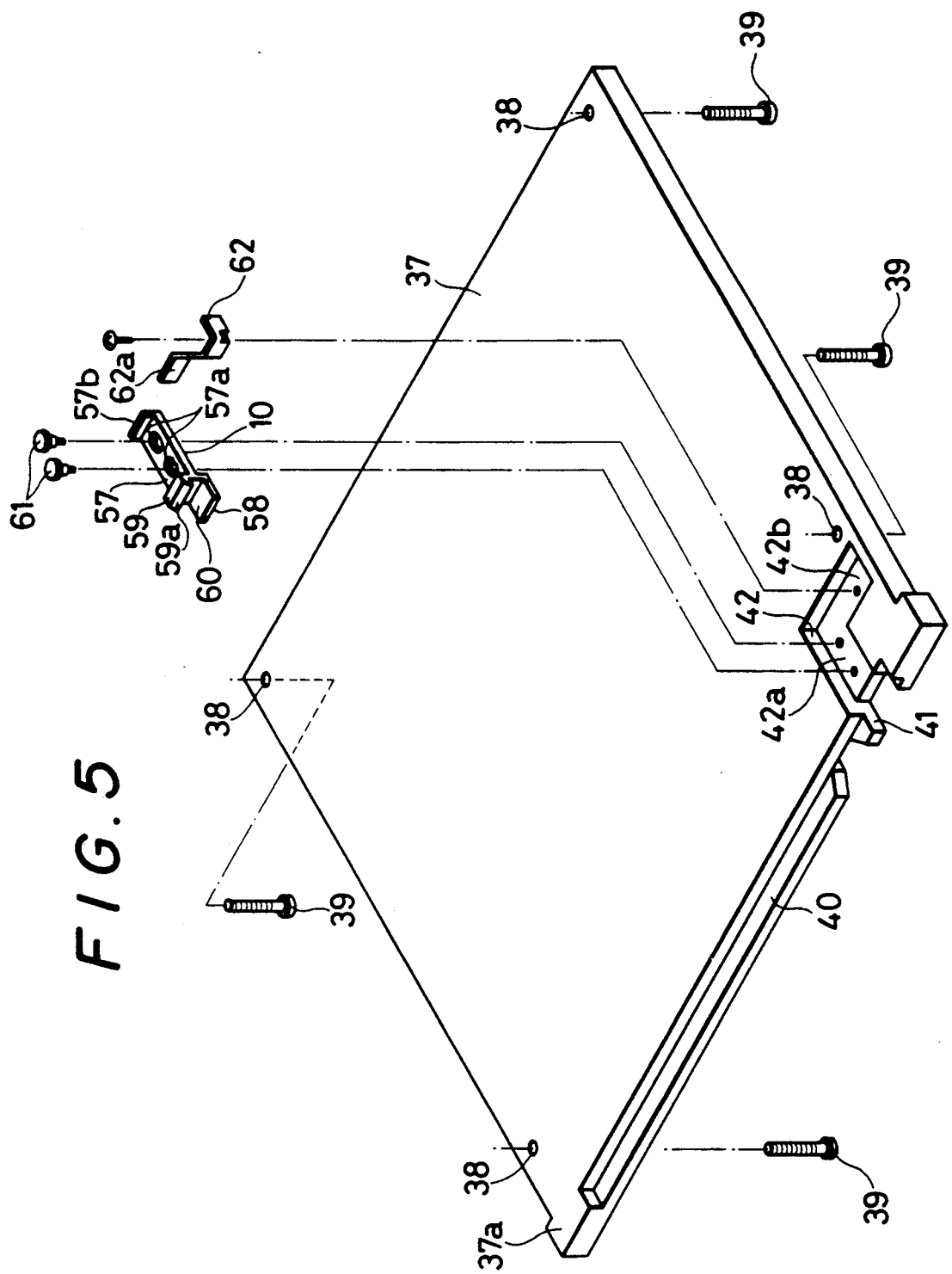
Figure 6:
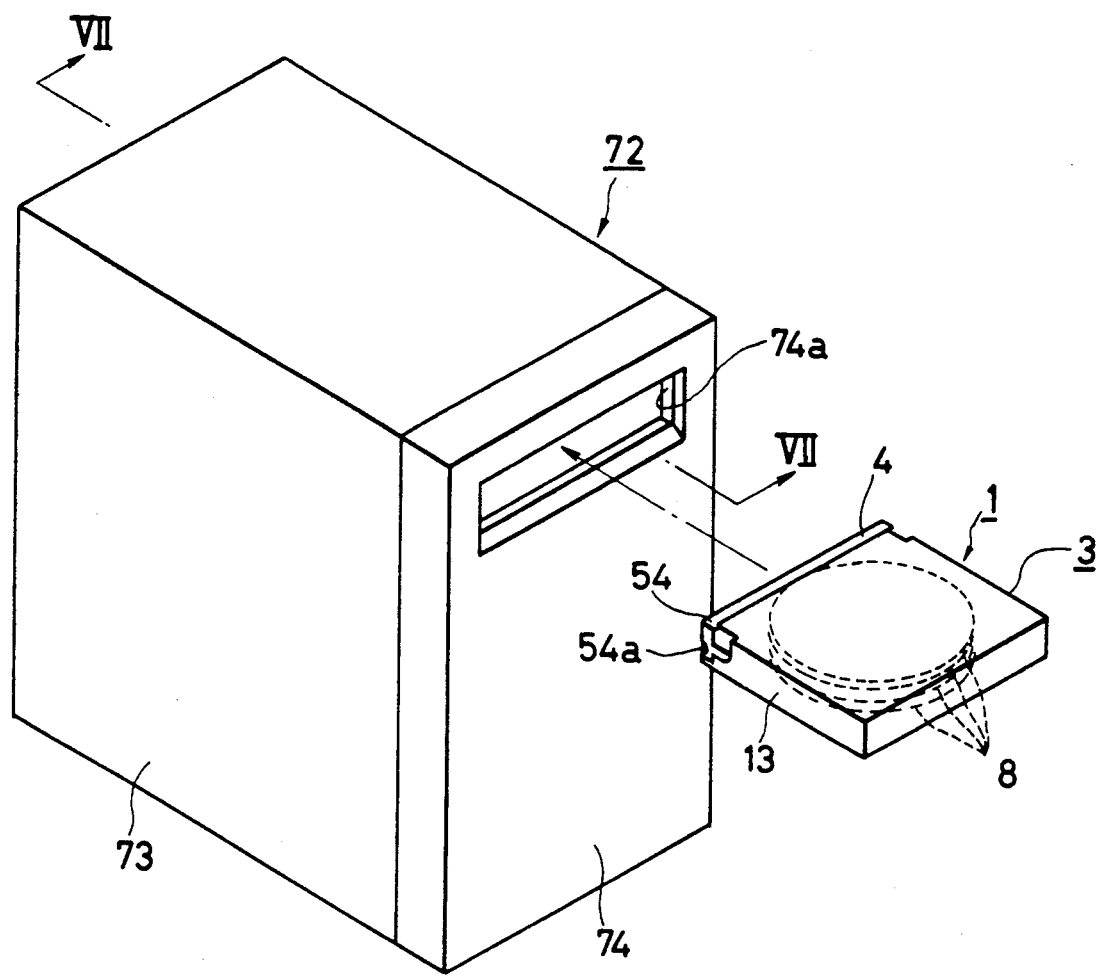

The partition plates 5 have the same thickness and outer shape. Engaging portions 43 and 43' of the partition plates 5 laterally extending from the left and right ends of the front end portion thereof (Although FIG. 4 shows only the uppermost partition plate 5, the same portions are formed on the remaining three partition plates 5. This also applies to the following description.) are respectively engaged with the partition support recesses 29 and 30 formed in the left and right side walls 21 and 22 of the main portion 13. At the same time, corner portions 44 which are formed by notching the rear half of the right end face of each partition plate 5 from substantially its center are engaged with the partition plate support recesses 32 formed in the right inner wall 17 of the main portion 13. Projections 45 extending backward from the intermediate portions of the arcuated portions of the rear halves of the left end faces and projections 46 extending backward from the right end portions of the rear end faces are respectively inserted in the partition plate support holes 31 formed in the left inner wall 16 of the main portion 13 and the partition plate support holes 33 formed in the rear inner wall 18. In addition, part of the rear edge of each partition plate 5 is inserted between the partition plate support projections 34 extending from the rear wall 24 of the main portion 13 or between the lowermost partion support projection 34 and the bottom plate 37. With this arrangement, the partition plates 5 are supported by the main portion 13 in a stacked state at predetermined intervals in the thickness direction.

The lowermost partition plate 5 is stacked on the bottom plate 37. In addition, two locking portions 47 and 48 extend backward from each partition plate 5. Pawls 47a and 48a of the locking portions 47 and 48 are respectively engaged with the rear end portions 26 and the partition plate locking portions 28 of the left inner wall 16 of the main portion 13 from the rear position, thereby preventing disconnection of the partition plates 5 from the magazine body 3.

Low upright walls 49 are respectively formed on the rear portions of the upper surfaces of the partition plates 5 near the right edges. Each upright wall 49 is arcuated about substantially the center of a corresponding partition plate 5.

With this arrangement, the space inside the magazine body 3 is partitioned into four thin partial spaces in the height direction by the partition plates 5. At the same time, the four partial spaces are defined to have substantially U shapes open forward. These U-shaped spaces serve as the above-described disk housing spaces 7.

Low guide pins 50 are fixed on the upper surface of each partition plate 5 at three positions of the right edge which are separate from each other in the forward/backward direction. An arm support pin 51 is fixed at a position slightly separated from the last guide pin 50 in a slightly left, oblique backward direction. In addition, a spring hook piece 5 extends from substantially the middle portion between the middle and the rear end of the right edge of the upper surface of each partition wall 5.

Reference numeral 53 denotes a notch formed at a position slightly shifted forward from the middle of the left edge of each partition plate 5. The notch 53 is formed at a position opposite to the spring mounting notch 25 formed in the left inner wall 16 of the main portion 13.

Reference numeral 54 denotes a front surface portion constituting a main portion of the lid 4. The front surface portion 54 has substantially the same size as that of the front surface of the body 3 and has a rectangular shape elongated in the right/left direction. In addition, the front surface portion 54 has a substantially U-shaped section open backward. Reference numerals 55 denote arm portions extending backward from substantially middle portions of the left and right end portions of the front surface portion 54 in the height direction. Support pins 55a are respectively formed in the rear end portions of the opposite side surfaces of the arm portions 55.

A shallow hook recess 54a having a substantially U shape is formed in substantially the middle portion of the right end face of the front surface portion 54 in the height direction. The front end of the hook recess 54a reaches the front surface of the front surface portion 54, while the size of the front end portion is increased toward the front surface.

The lid 4 is supported to be moved between the opening position and the closing position in such a manner that the arm portions 55 are positioned at the lid mounting notches 23 formed in the left and right side walls 21 and 22 of the main portion 13, and at the same time the support pins 55a formed on the arm portions 55 are pivotally inserted in the lid support holes 36 formed in the side walls 21 and 22, respectively. When the lid 4 is moved to the closing position, a lower end portion 56 of the front surface portion 54 except for left and right end portions is substantially fitted in the notch 40 formed in the bottom plate 37. In this state, the lower end portion 56 is brought into contact with the surface of the notch 40 facing forward, thus preventing the lid 4 from further pivoting to the counter-opening position.

Reference symbol 56a denotes an inclined surface formed on the lower surface of the lower end portion of the lid 4, i.e., a surface facing down when the lid 4 is moved to the closing position, at a position to oppose the notch 41 formed in the front end portion 37a of the bottom plate 37. In the above state, the inclined surface is displaced backward as the surface extends upward.

The lock slider 10 is obtained by integrally forming a plate-like main portion 57 which is elongated in the forward/backward direction and a substantially U-shaped front end portion 58 which is open forward viewed in the right/left direction. Holes 57a elongated in the forward/backward direction are formed in the main portion 57, and a rear end portion 57b of the main portion 57 is bent upward. In addition, an upper piece 59 of the front end portion 58 is shorter than a lower piece 60, and a front end portion 59a of the upper piece 59 has an inclined surface which is displaced backward as the surface extends upward.

The lock slider 10 having the above-described structure is designed to be moved within a predetermined range in the forward/backward direction in such a manner that the lower portion of the front end portion 58 is positioned in the notch 41 formed in the bottom plate 37 and the main portion 57 is positioned in the portion 42a of the slider mounting recess 42 which is formed in the bottom plate 57 and extends in the forward/backward direction, while guide pins 61 fixed in the recess 42 are slidably engaged with elongated holes 58a. Reference numeral 62 denotes a leaf spring as a spring means arranged at the rear end portion of the slider mounting recess 42. A distal end portion 62a of the leaf spring 62 is brought into elastic contact with the rear end portion 57b of the lock slider 10 from the rear side. As a result, the lock slider 10 is normally biased forward, and hence the front end face of the lower piece 60 of the front end portion of the lock slider 10 is held at a lock position located on the same plane as that of the front end face of the bottom plate 37 while the lock slider 10 is not biased backward. In this state, the upper piece 59 is positioned to cross the locus of pivotal movement of the lower end portion 56 of the front surface portion 54 of the lid 4.

When the lid 4 is moved to the closing position from a position other than the closing position, the inclined surface 56a formed on the lower surface of the lower end portion 56 of the front surface portion 54 is brought into contact with the inclined surface 59a formed on the upper piece 59 of the lock slider 10 so as to urge the inclined surface 59a obliquely backward to move the lock slider 10 backward against the elastic force of the leaf spring 62. As a result, the lower end portion 56 of the front surface portion 54 is positioned below the upper piece 59 of the lock slider 10 at substantially the same time when the lid 4 is moved to the closing position. Consequently, the lock slider 10 which is once moved backward is returned to the lock position by the elastic force of the leaf spring 62, and the upper piece 59 is engaged with the lower end portion 56 of the lid 4 from the above. With this operation, movement of the lid 4 to the opening position can be prevented. That is, the lid is locked to the closing position.

Since no opening is formed in the magazine body 3 except for the opening 2 formed in its front surface, the interior of the magazine body 3 is substantially perfectly sealed while the lid 4 is set at the closing position to close the opening 2. In addition, the state of the lid 4 set at the closing position can be reliably held by the lock slider 10 as described above.

Since entering of dust and the like into the disk magazine 1 can be prevented at least in a state wherein the opening 2 is closed by the lid 4, adhering of dust and the like to the optical magnetic disks housed in the disk magazine 1 can be prevented. In addition, this arrangement can prevent the optical magnetic disk 8 from slipping outside through the opening 2.

The disk hold spring 9 is made of a leaf spring material and has a substantially rectangular shape which is elongated in the forward/backward direction when viewed in the right/left direction and is bent in substantially the form of an L shape when viewed from the above. The disk hold spring 9 is formed into a substantially U shape which has a substantially middle portion in the forward/backward direction extends to the right and is open leftward. In addition, the disk hold spring 9 comprises four hold pieces 64 which can be respectively bent in the thickness direction by three elongated grooves 63 formed at substantially equal intervals in the height direction.

Most of the disk hold spring 9 is arranged in the space between the left side wall 21 of the main portion 13 and the left inner wall 16, and middle portions 64a of the hold pieces 64 respectively extend into the disk housing spaces 7 through the spring mounting notch 25 formed in the left inner wall 16 while portions of the middle portions 64a are located in the notches 53 of the partition plates 5.

The optical magnetic disks 8 are respectively housed in the disk housing spaces 7 at their deepest positions while the peripheries of the optical magnetic disks 8 are respectively in contact with portions of the arcuated portion 27 of the inner wall 16 corresponding to the disk housing spaces 7 and with the upright walls 49 of the partition plates 5 on which the optical magnetic disks 8 are mounted. When the middle portions 64a of the hold pieces 64 of the disk hold spring 9 are brought into elastic contact with the peripheries of the optical magnetic disks 8 at slightly forward positions in this state as shown in FIG. 1, the optical magnetic disks 8 are biased backward in a slightly oblique right direction. As a result, the optical magnetic disks 8 are held at the deepest positions of the disk housing spaces 7.

FIG. 1 shows only the disk push means 6 arranged in the uppermost disk housing space 7. However, other three disk push means 6 have the same structure as that of the uppermost disk push means 6.

As described above, each dish push means 6 comprises the slide lever 11 and the pivot arm 12.

The slide lever 11 has a plate-like shape which is elongated in the forward/backward direction and has guide recesses 65 formed in its lower surface at three positions separate from each other in the longitudinal direction. Each guide recess 65 has an elliptic shape elongated in the backward/forward direction. In addition, a rack 66 is formed on the rear end portion of the left edge of the slide lever 11, and a small spring hook piece 67 extends from the rear end portion of the right edge of the slide lever 11.

The slide lever 11 is supported by the partition plate 5 so as to slide within a predetermined range in the forward/backward direction in such a manner that the guide recesses 65 are slidably engaged with the three guide pins 50 fixed on the upper surface of the partition plate 5. Therefore, the front end face 11a of the slide lever 11, i.e., the portion 11a to be depressed is directed forward. In addition, the slide lever 11 is normally biased forward by the tensile force of a tension spring 68 serving as a spring means hooked between the spring hook piece 67 of the slide lever 11 and the spring hook piece 52 formed on the partition plate 5. Hence, while the slide lever 11 is not biased backward, the portion 11a (to be depressed) is held at a forward position slightly protruding from the front end face of the magazine body 3.

A right end portion 69 of the pivot arm 12 has a substantially fan-like shape when viewed from the above, and a remaining portion 70 is formed into a substantially L shape having a slow curve. In addition, a support hole 71 is formed at a position corresponding to the pivot of the fan-like portion 69, and an arcuated rack 69a is formed on the fan-like portion 69.

The pivot arm 12 is supported by the partition plate 5 so as to be freely pivoted in the forward/backward direction in such a manner that the arm support pin 51 fixed on the partition plate 5 is inserted in the support hole 71. In addition, the rack 69a is meshed with the rack 66 formed on the slide lever 11. When the slide lever 11 is at the forward position, a substantially half of the pivot end side of the slide lever 11 is held at a non-push position which is in contact with the rear wall 24 of the main portion 13. In this state, the front edge of the pivot arm 12 is brought into slight contact with or placed near the optical magnetic disk 8 from behind.

When the slide lever 11 is depressed from the front of the slide lever 11 to be moved backward, since the rack 66 moves the rack 69a of the pivot arm 12 substantially backward, the pivot arm 12 is pivoted to the push position indicated by an alternate long and two short dashed line in FIG. 1. As a result, a corresponding optical magnetic disk 8 is pushed out to partially protrude forward from the opening 2 of the magazine body 3, as indicated by an alternate long and two short dashed line in FIG. 1. At this time, the hold piece 64 of the disk hold spring 9 which has been in contact with the optical magnetic disk 8 is pushed to the left once. Subsequently, when the optical magnetic disk 8 does not oppose the hold piece 64, it returns to the position at which it protrudes into the disk housing space 7.

Note that release of lock of the lid 4 by means of the lock slider 10, movement of the lid 4 from the closing position to the opening position, and depression of the slide lever 11 are performed by attaching the disk magazine 1 to a recording/reproducing apparatus (to be described later) or using the disk loading apparatus attached to the recording/reproducing apparatus.

An embodiment wherein the disk loading apparatus of the present invention is applied to a disk loading apparatus in a recording/reproducing apparatus using the above-described optical magnetic disk magazine will be described below with reference to FIGS. 6 to 14.

Reference numeral 72 denotes a recording/reproducing apparatus.

Reference numeral 73 denotes an outer casing of the recording/reproducing apparatus 72. A magazine insertion port 74a is formed in the upper end portion of a front surface 74 of the outer casing 73. The magazine insertion port 74a is elongated in the right/left direction (With regard to the recording/reproducing apparatus 72, in FIG. 6, the left oblique downward direction is assumed to be the left direction; and the right oblique upward direction, the right direction. In addition, in FIG. 6, the right oblique downward direction is assumed to the forward direction; and the left oblique upward direction, the backward direction.)

First to fourth recording/reproducing drive units $75_1$, $75_2$, $75_3$ (not shown) and $75_4$ are arranged in a substantially rear half space in the outer casing 73 at predetermined intervals in the vertical direction. The uppermost first recording/reproducing drive unit $75_1$ is placed at a position substantially opposite to the magazine insertion port 74a. These four recording/reproducing drive units $75_1$, $75_2$, $75_3$ and $75_4$ respectively comprise members and mechanisms necessary for a recording and/or reproducing operation with respect to the optical magnetic disks 8, e.g., mechanical chassis 76 fixed to the outer casing 73, turntables 77 to be respectively rotated by motors (not shown) fixed to the mechanical chassis 76, recording/reproducing head portions (not shown) respectively supported by the mechanical chassis 76 so as to be horizontally movable, disk lift members 78 respectively supported by the mechanical chassis 76 so as to be vertically movable, and clampers 79 respectively supported by the disk lift members 78.

Reference numeral 80 denotes a magazine carrier on which the disk magazine 1 is detachably mounted. The magazine carrier 80 is supported by a guide means (not shown) fixed to the outer casing 73 so as to be vertically movable, and is moved by a carrier moving mechanism 81 between four feed positions at which the optical magnetic disks 8 in the mounted disk magazine 1 are respectively fed to the recording/reproducing drive units $75_1$, $75_2$, $75_3$ and $75_4$. The carrier moving mechanism 81 comprises a pulley 81d for applying proper tension to a wire 81c looped around pulleys 81a and 81b rotatably supported by the outer casing 73, and a motor for driving the pulley 81b. Part of a side 81c' of the wire 81c is fixed to a side wall of the magazine carrier 80.

The magazine carrier 80 has a rectangular frame-like shape which is elongated in the forward/backward direction. A magazine mounting portion 82a is formed on the upper surface of a bottom plate 82 of the magazine carrier 80. The disk magazine 1 is inserted from the initial position into the outer casing 73 by a predetermined amount to be mounted on the magazine carrier 80.

Note that a lid opening/closing mechanism 83 for moving the lid 4 of the disk magazine 1 to the opening position is provided to the magazine carrier 80. When the disk magazine 1 is to be mounted on the magazine carrier 80, the lid 4 is moved to the opening position. When the disk magazine 1 is to be taken out from the magazine carrier 80, the lid 4 is moved to the closing position.

Figure 7:
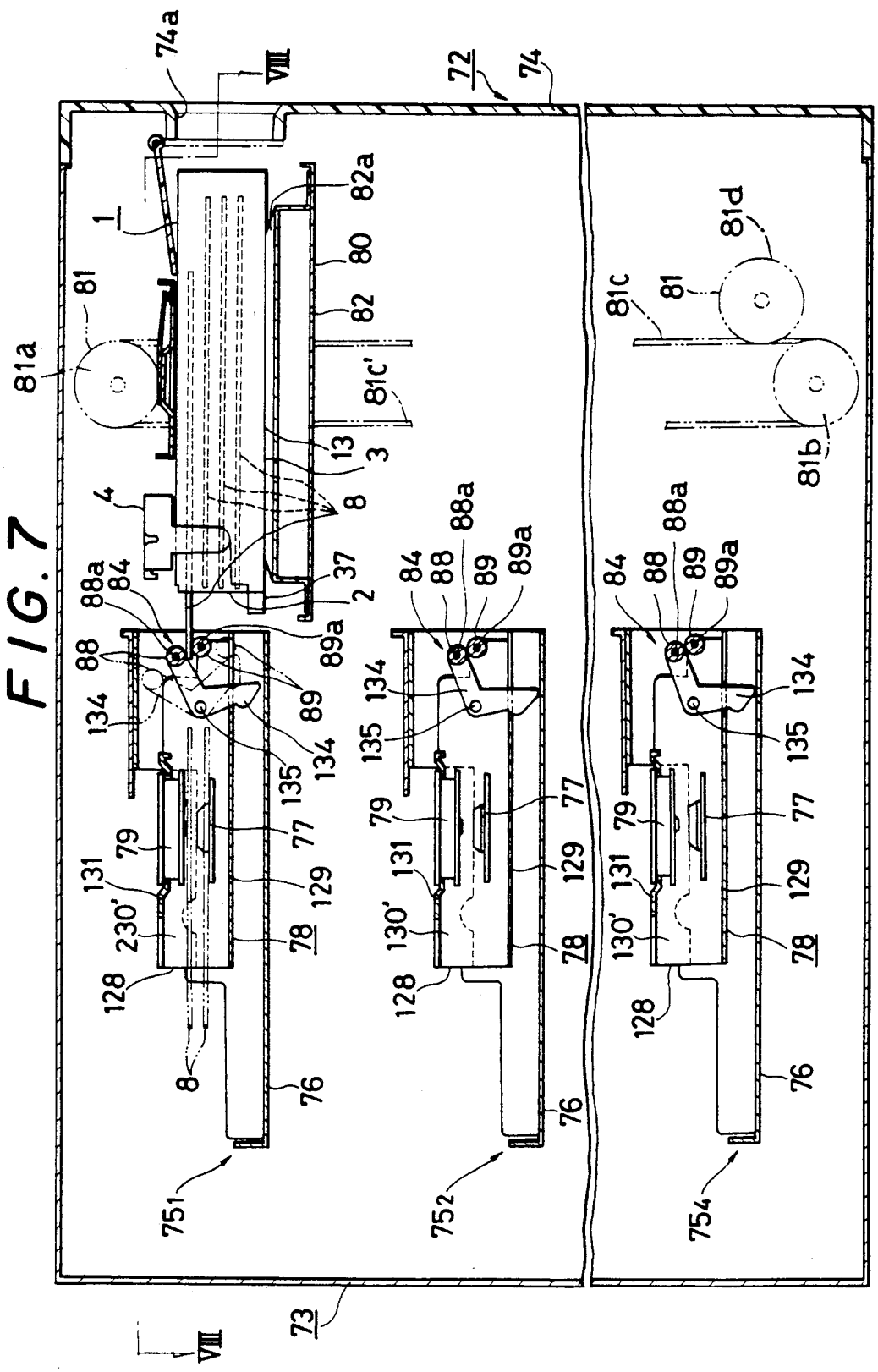
Figure 8:
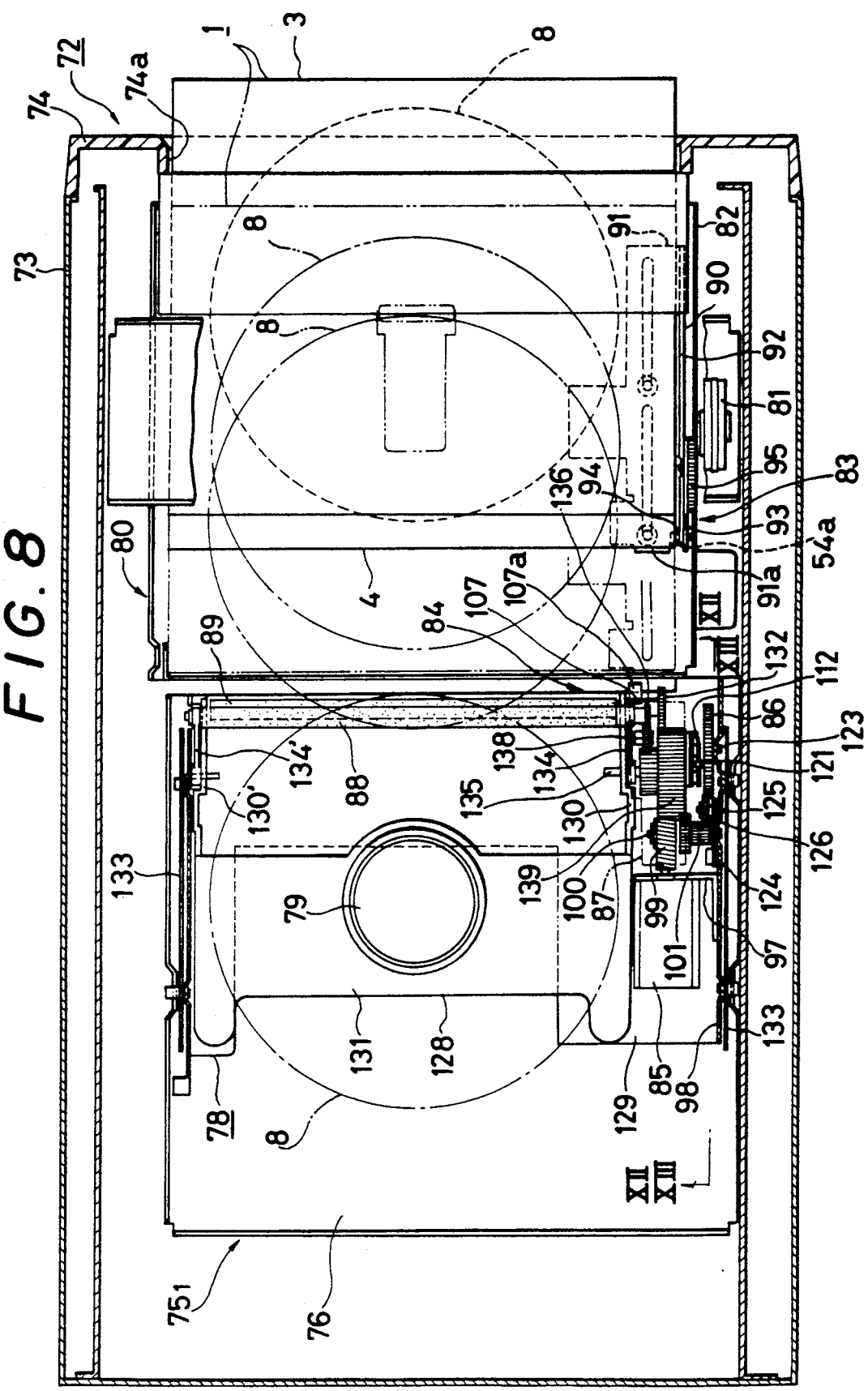
Figure 12A:
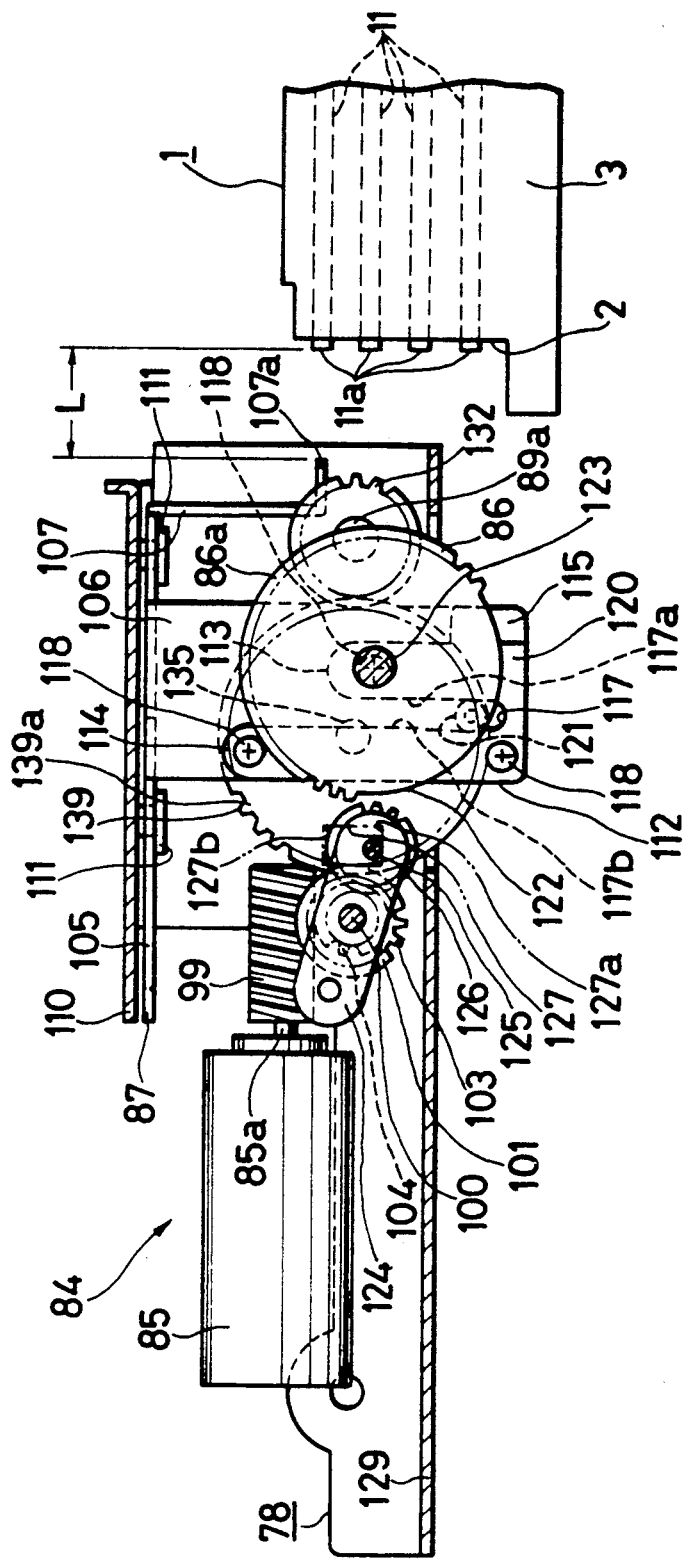
FIGS. 12A to 12D are partially enlarged side views sequentially showing disk loading operations.
Figure 12B:
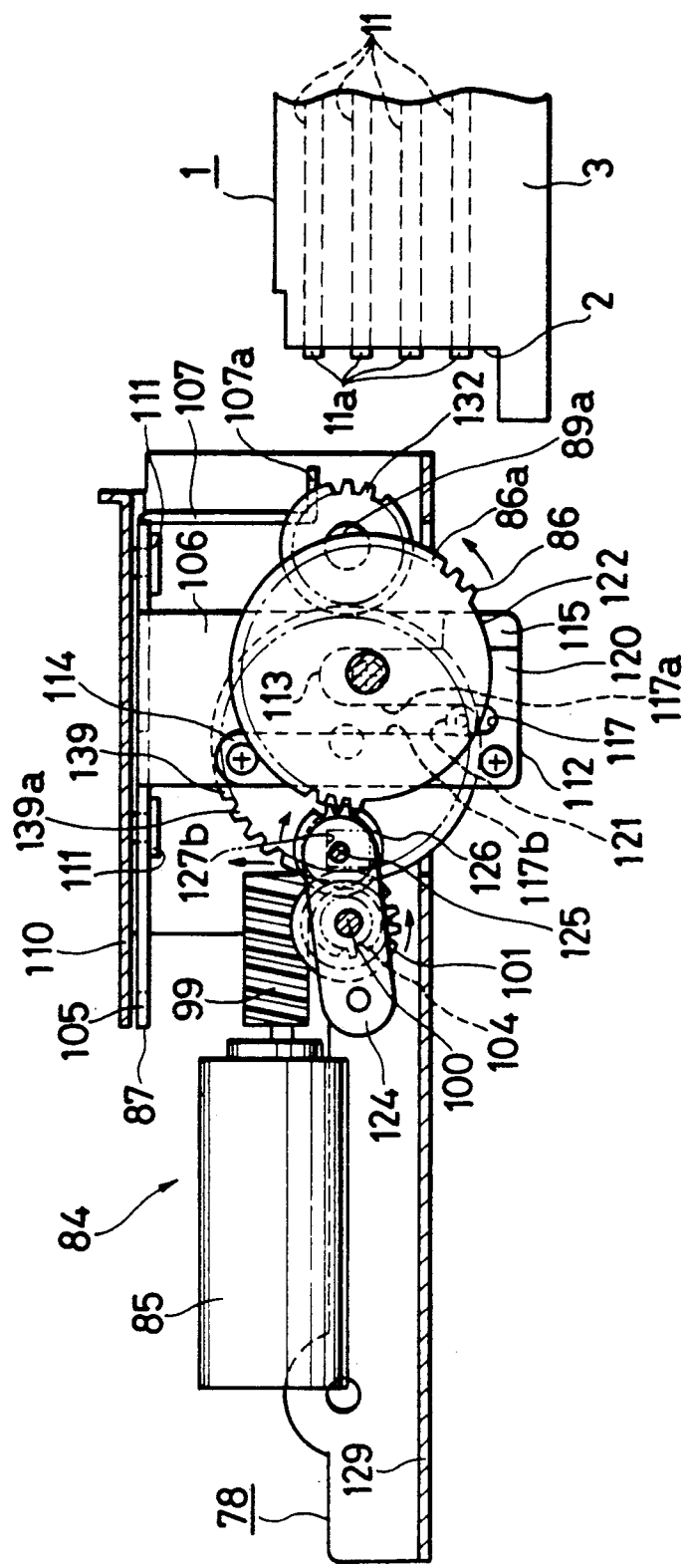
Figure 12C:
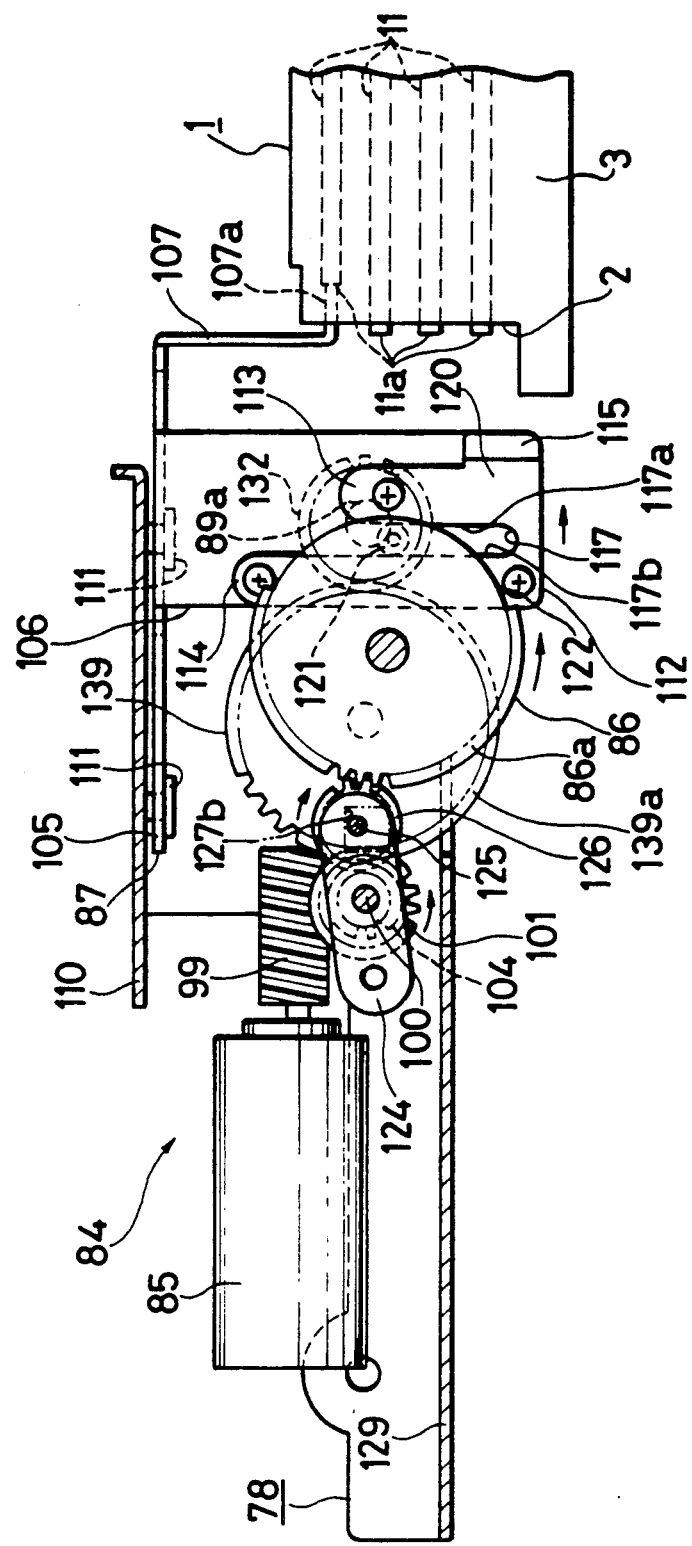
Figure 12D:
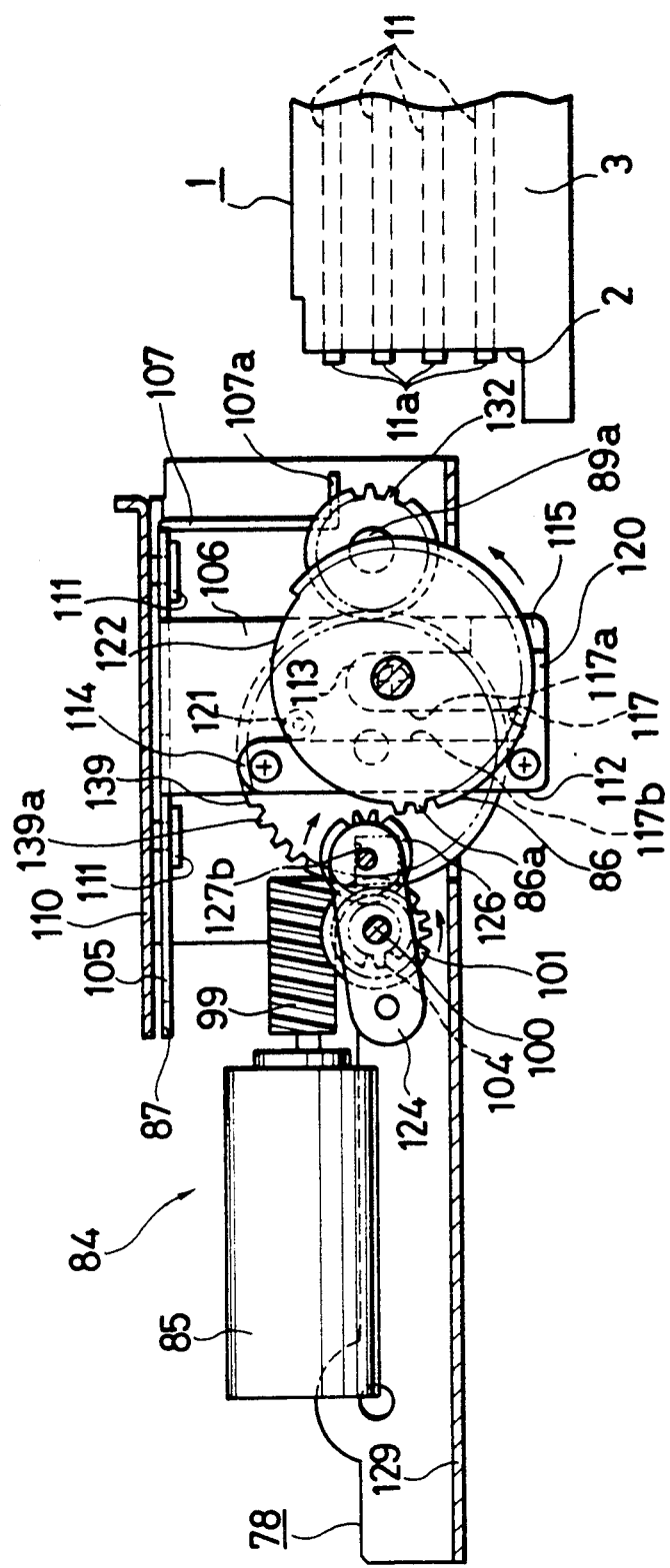

Reference numerals 84 denote disk loading apparatuses respectively provided to the disk lift members 78 of the recording/reproducing drive units 75 (FIG. 7 shows the overall arrangement of only the disk loading apparatus 84 provided to the disk lift member 78 of the uppermost recording/reproducing portion $75_1$, and shows partial arrangements of the disk loading apparatuses provided to the disk lift members 78 of the other three recording/reproducing drive units $75_2$, $75_3$ and $75_4$. However, these disk loading apparatuses have the same structure.) Each loading apparatus 84 is designed to perform loading, i.e., taking out a predetermined one of the four optical magnetic disks 8 housed in the disk magazine 1 to feed it to a corresponding disk lift member 78, and unloading, i.e., returning the optical magnetic disk 8, which has been fed to the disk lift member 78, into the disk magazine 1. Each loading apparatus 84 comprises one loading motor 85, a driving gear 86 to be rotated by the motor 85, a press lever 87 which is supported to be movable in the forward/backward direction and is moved by the driving gear 86, a pair of upper and lower disk feed rollers 88 and 89 serving as a disk transfer means to be rotated by the motor 85, an the like. When loading is to be performed, the loading motor 85 is rotated in the forward direction to cause the press lever 87 to urge a predetermined one of the four slide levers 11 of the disk magazine 1, as shown in FIG. 12C. As a result, a corresponding optical magnetic disk 8 is pushed out from the disk magazine 1 to the disk lift member 78 side as indicated by a thick alternate long and two short dashed line in FIG. 8. Subsequently, the optical magnetic disk 8 which was pushed out of the disk magazine 1 is transferred to the disk lift member 78 by the disk feed rollers 88 and 89, as indicated by an alternate long and short dashed line in FIG. 8. When unloading is to be performed, the loading motor 85 is rotated in the reverse direction to cause the disk feed rollers 88 and 89 to transfer the optical magnetic disk 8 which is placed on the disk lift member 78 into the disk magazine 1. At this time, the press lever 87 is controlled so as not to move.

Reference numeral 90 denotes a lid opening slider which is supported at a corner portion on the left side of the magazine carrier 80 so as to be freely moved in the forward/backward direction within a predetermined range. The lid opening slider 90 comprises a horizontal bottom portion 91 and a side portion 92 extending from the left edge of the bottom portion 91. An abutment 91a is formed upright on the rear edge of the bottom portion 91 and is normally biased forward by an elastic means (not shown).

Reference numeral 93 denotes a lid opening arm pivotally supported on the left side surface of the side portion 92. A hook pin 94 extends from the right side surface of the pivot end portion of the lid opening arm 93. A fan-like gear 95 is fixed to the left side surface of the lid opening arm 93. Reference numeral 96 denotes a rack fixed to the magazine carrier 80 so as to extend in the forward/backward direction above the fan-like gear 95.

While the opening slider 90 is not biased backward, the fan-like gear 95 is meshed with the front end portion of the rack 96. As a result, the opening arm 93 is held at a position at which the opening arm 93 substantially horizontally extends, as indicated by a solid line in FIG. 11.

Figure 11:
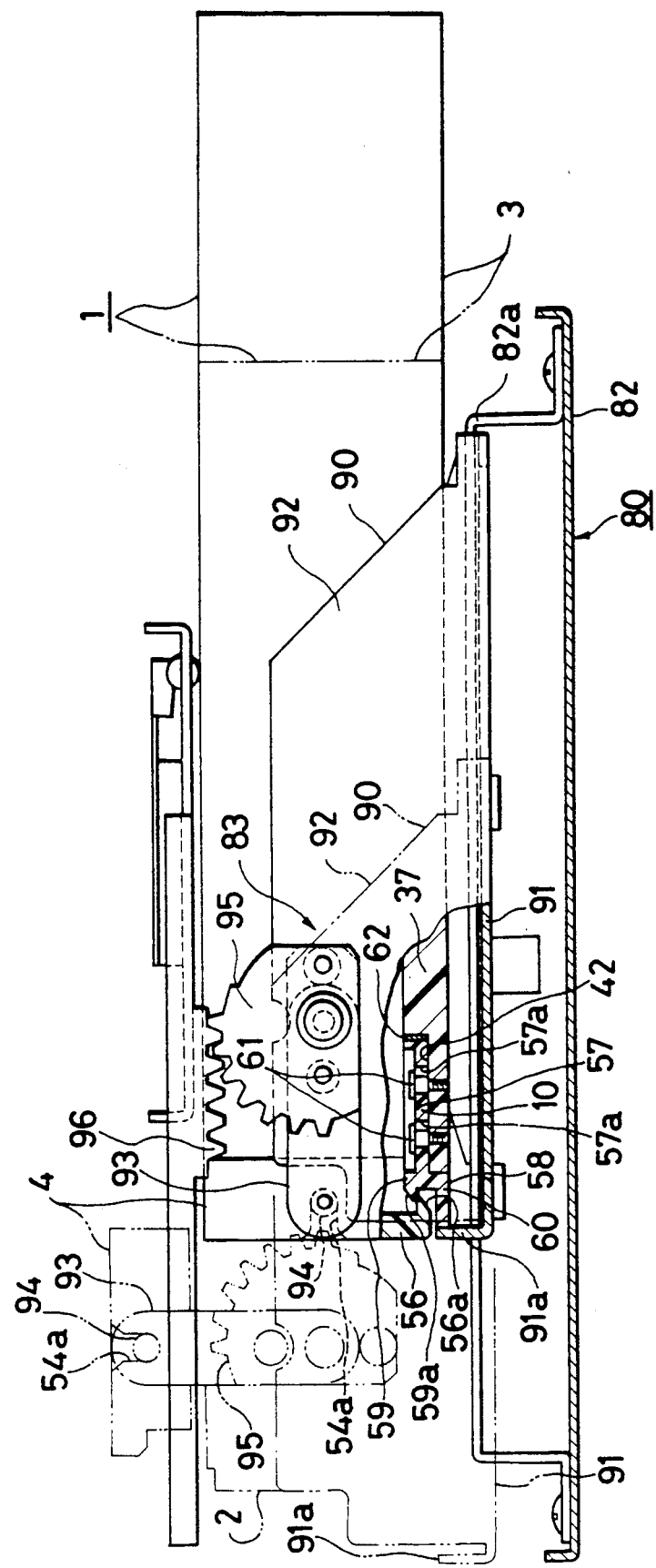

When the disk magazine 1 is inserted in the magazine carrier 80, the lower piece of the front end portion 58 of the lock slider 10 is brought into contact with the abutment 91a of the lid opening slider 90 and is relatively inserted in the disk magazine 1. As a result, the upper piece 59 is moved to a lock release position which is separated from the locus of rotation of the lower end portion 56 of the lid 4, as shown in FIG. 11. At substantially the same time, the hook pin 94 of the lid opening arm 93 is relatively engaged with the hook recess 54a formed in the lid 4. When the disk magazine 1 is further inserted, the lid opening slider 90 and the disk magazine 1 are integrally moved backward. At this time, when the fan-like gear 95 is meshed with the rack 96 and moved backward, the fan-like gear 95 and the lid opening arm 93 are rotated clockwise in FIG. 11. As a result, the lid 4 is moved to the opening position, as indicated by an alternate long and two dashed line in FIG. 11.

When the lid opening slider 90 is moved to a predetermined position, the lid opening slider 90 and the disk magazine 1 are locked to the magazine carrier 80 by a lock means (not shown) formed on the magazine carrier 80. With this operation, attachment of the disk magazine 1 on the magazine carrier 80 is completed. Movement of the magazine carrier 80 is performed in this state. Therefore, when the magazine carrier 80 opposes the recording/reproducing drive units 75, the portions 11a (to be depressed) of the slide levers 11 of the disk push means 6 formed on the disk magazine 1 oppose the recording/reproducing drive units 75, respectively.

Each disk loading apparatus 84 comprises a disk push portion, including the driving gear 86 and the press lever 87, for actuating a predetermined disk push means 6 of the disk magazine 1, a disk transfer portion, including the disk feed rollers 88 and 89, for transferring the optical magnetic disk 8 which is pushed out of the disk magazine 1, to the disk lift member 78 and for returning the optical magnetic disk 8 into the disk magazine 1, and one driving portion including the loading motor 85 and commonly used for the disk push portion and the disk transfer portion.

Reference numeral 97 (see FIG. 8) denotes a motor support plate fixed to a left side wall 98 of the disk lift member 78. The loading motor 85 is fixed on the motor support plate 97 in a direction in which the axial direction of the loading motor 85 is aligned with the forward/backward direction. A worm gear 99 is fixed to a rotating shaft 85a of the loading motor 85.

Reference numeral 100 denotes a support shaft horizontally extending from the left side wall 98 to the right. A rotation transmitting member 101 is rotatably supported by the support shaft 100. The rotation transmitting member 101 is designed such that a worm wheel 102, a large-diameter spur gear 103, and a pinion gear 104 are coaxially arranged in this order and are integrally formed. The worm wheel 102 is meshed with the worm gear 99.

The loading motor 85 is rotated in the forward direction during loading, and is rotated in the reverse direction during unloading. The direction of forward rotation of the loading motor 85 coincides with that of the clockwise rotation of the rotation transmitting member 101 in FIG. 12.

The press lever 87 is obtained by integrally forming a horizontal upper piece 105, a side piece 106 and a press piece 107. The side piece 106 is positioned to protrude downward from the left edge of the upper piece 105. The press piece 107 protrudes downward from the right end of the front edge of the upper piece 105 and has a substantially L shape when viewed from the left side. Guide holes 108 which are elongated in the forward/backward direction are formed in the upper piece 105, and three screw holes 109 (see FIG. 10) are formed in the side piece 106.

Figure 9:
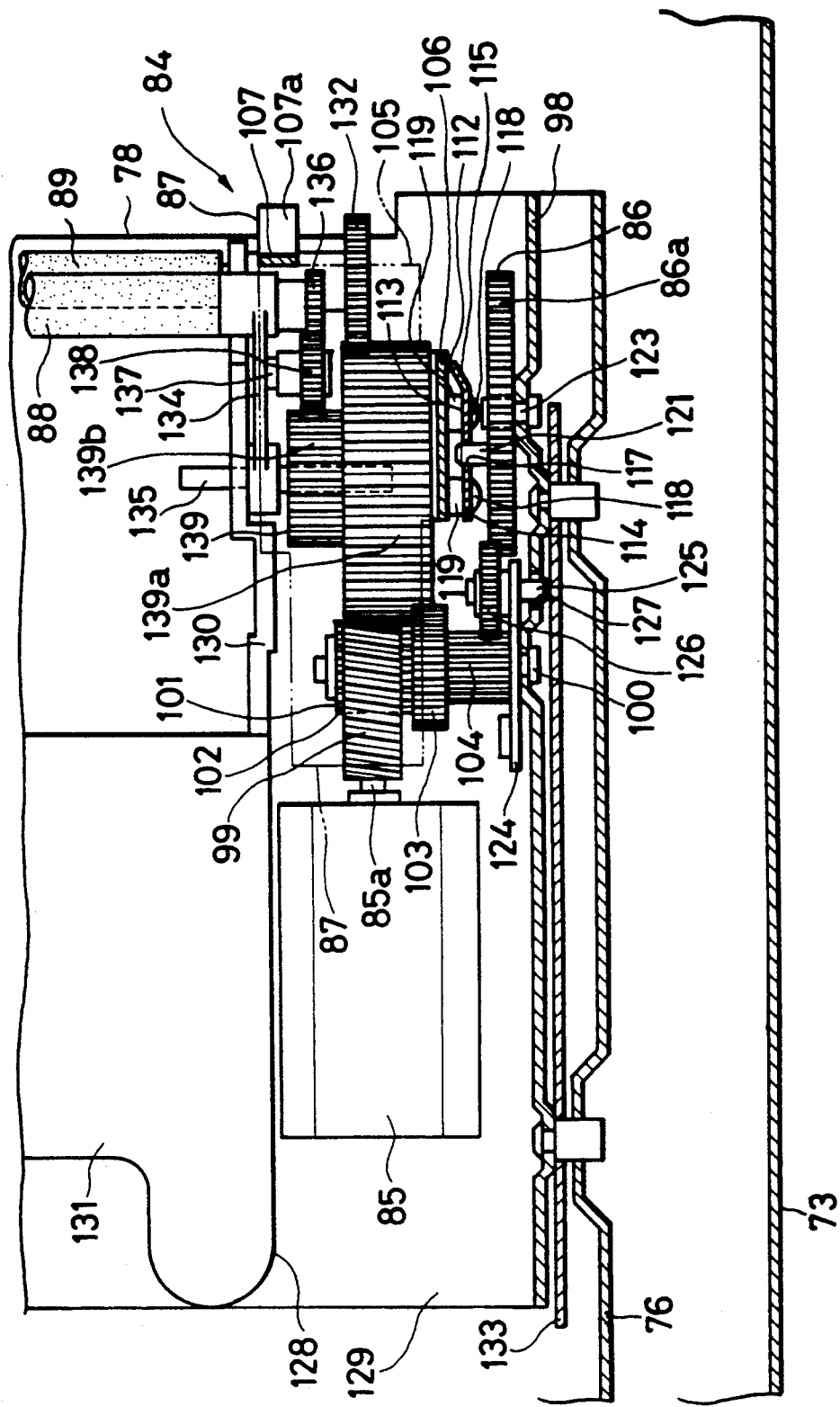
Figure 10:
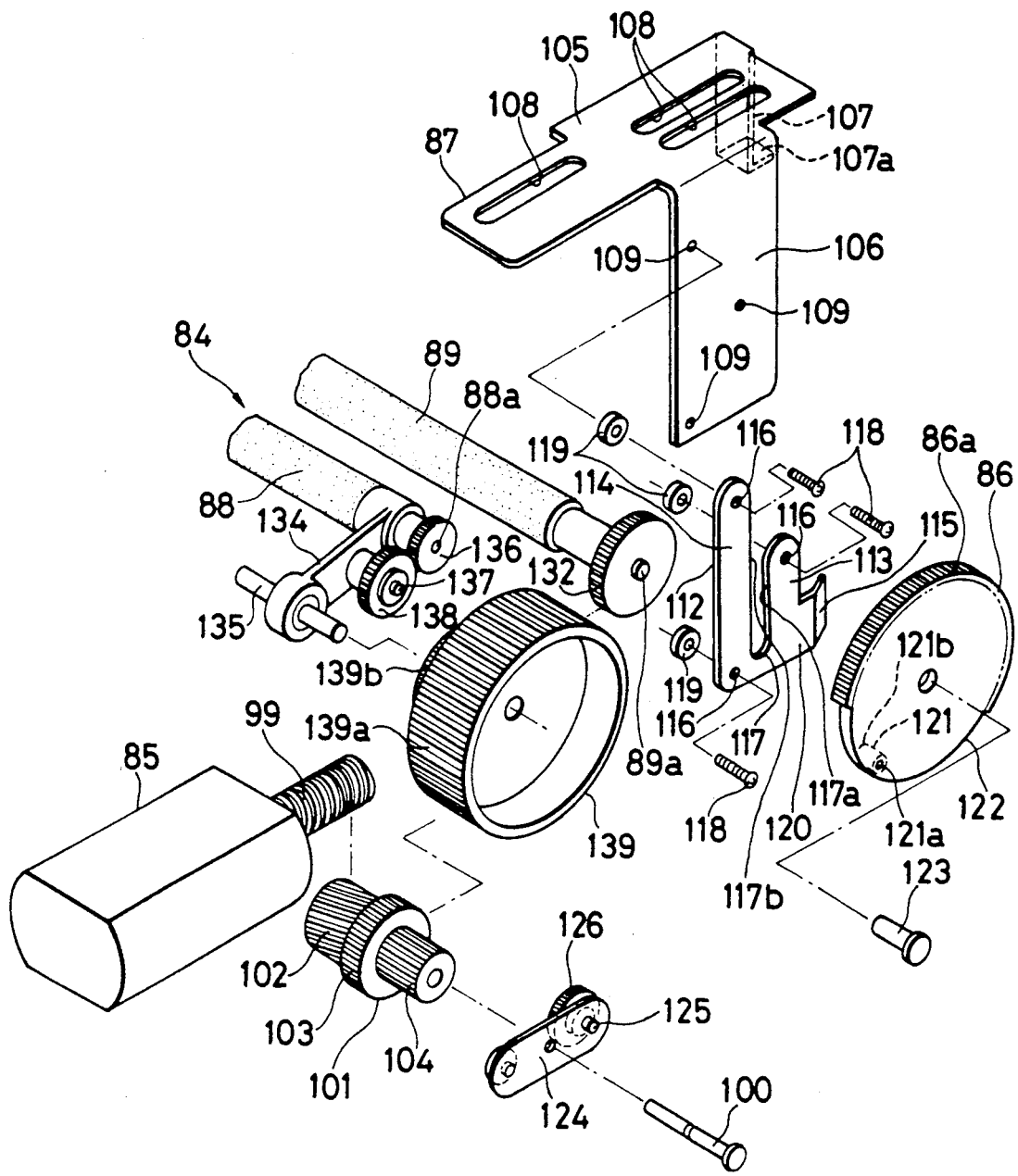

Three guide pins 111 (only two of them are shown in FIG. 12) are fixed on the right end portion of the lower surface of a top plate 110 of the disk lift member 78. The press lever 87 is supported by the top plate 110 so as to be freely moved in the forward/backward direction within a predetermined range in such a manner that the guide holes 108 of the press lever 87 are slidably engaged with the guide pins 111, respectively. As shown in FIG. 9, the side piece 106 substantially horizontally opposes the left side wall 98 of the disk lift member 78 with a slight gap formed therebetween.

Reference numeral 112 denotes a control plate as a clutch means attached to the press lever 87.

The control plate 112 is integrally formed by the following components using a leaf spring material: a middle piece 113 having a height substantially ½ that of the side piece 106 of the press lever 87; a rear piece 114 located behind the middle piece 113, having a lower end portion continuously formed with the lower end portion of the middle piece 113, and having a height substantially 1.5 times that of the middle piece 113; and a guide piece 115 which has a width slightly smaller than that of the middle piece 113 and which is continuously formed with substantially the lower half of the middle piece 113 and bent in a substantially right oblique forward direction. Mounting holes 116 (see FIG. 10) are respectively formed in the upper end portion of the middle piece 113 and the upper and lower end portions of the rear piece 114. A portion 117 between the middle piece 113 and the rear piece 114 has a groove-like shape which is vertically elongated. The lower end portion of the portion 117 (to be referred to as a groove hereinafter) is located at the lower end portion of the control plate 112, and its upper end is open.

The control plate 112 is fixed to the side piece 106 such that screws 118 inserted through the mounting holes 116 are threadably engaged with the screw holes 109, respectively. By respectively inserting spacers 119, in which the screws 118 are fitted, between the side piece 106 and the control plate 112, a predetermined gap between the side piece 106 and the control plate 112, i.e., a gap allowing the right end of the guide piece 115 to be brought into slight contact with or located near the side piece 106 is formed.

Since the control plate 112 is supported by the press lever 87 so as to be moved integrally therewith, and its attachment to the press lever 87 is performed in the above-described manner, a portion 120 (to be referred to as a flexible portion hereinafter) of the portion extending forward from a position where the middle and rear pieces 113 and 114 are continuous except for the upper end portion of the middle piece 113 fixed to the press lever can be displaced to some degree in the thickness direction, i.e., the right/left direction.

The driving gear 86 substantially has a shape of a spur gear. The radius of the driving gear 86 is slightly smaller than the height of the middle piece 113 of the control plate 112. A press pin 121 as an engaging portion substantially horizontally extends from a position near the periphery of the right side surface of the driving gear 86. Note that the press pin 121 consists of a shaft 121a fixed to the driving gear 86, and a roller 121b rotatably fitted on the shaft 121a. Part of the toothed portion of the driving gear 86 is removed. The removed portion, i.e., a non-toothed portion 122a extends within the range of a central angle of about 135°. Consequently, a toothed portion 86a is formed within the range of a central angle of about 225°.

Reference numeral 123 denotes a gear support shaft horizontally extending to the right from a position located at substantially the same height as that of a position of a portion of the left side wall 98 of the disk lift member 78 opposite to the control plate 112, at which the middle piece 113 of the control plate 112 is fixed to the press lever 87. The driving gear 86 is rotatably supported by the gear support shaft 123.

With this arrangement, the driving gear 86 is positioned such that a given range of the lower portion of the locus of rotation of the press pin 121 opposes the flexible portion 120 of the control plate 112. The distal end of the press pin 121 extends near the side piece 106 of the press lever 87 from the left.

Note that the distal end portion of the press pin 121 is slidably engaged with the lower end portion of the groove 117 of the control plate 112 prior to loading.

Reference numeral 124 denotes an elongated plate-like swing lever. Substantially the middle portion of the swing lever 124 is pivotally supported by a portion between the rotation transmitting member 101 of the support shaft 100 which supports the rotation transmitting member 101 and the left side wall 98. A swing gear 126 is rotatably supported by the right portion of a shaft 125 which is fixed to the swing lever 124 such that one pivot end portion extends in the thickness direction. The swing gear 126 is always meshed with the pinion gear 104 of the rotation transmitting member 101.

Note that reference numeral 127 denotes a restricting hole formed in the left side wall 98 of the disk lift member 78. The left end portion of the shaft 125 supporting the swing gear 126 is positioned in the restricting hole 127. As a result, the pivotal range of the swing lever 124 is restricted such that the swing lever 124 pivots between a position (to be referred to as a first position hereinafter) where the shaft 125 is in contact with a lower edge 127a of the restricting hole 127 as shown in FIG. 12A and a position (to be referred to as a second position hereinafter) where the shaft 125 is in contact with an upper edge 127b of the restricting hole 127 as shown in FIG. 12B. In addition, the swing gear 126 opposes the driving gear 86 substantially from behind, so that whenever the swing gear 126 is positioned to oppose the toothed portion 86a of the driving gear 86, they are meshed with each other regardless of the position of the swing lever 124 in the pivotal range. Moreover, when the rotation transmitting member 101 is rotated, its rotational force is applied to the swing lever 124 through a friction means. As a result, a pivotal force acts on the swing lever 124.

FIG. 12A shows a state prior to loading of a disk and a state when disk unloading is completed. In this state, the swing lever 124 is set at the first position, and a clockwise end (in FIG. 12A) of the non-toothed portion 122 of the driving gear 86 opposes the swing gear 126 while the press pin 121 is located at a position (to be referred to as an initial position hereinafter) where the pin 121 is engaged with the lower end portion of the groove 117 of the control plate 121 at a position slightly shifted backward from the position immediately under the rotational center of the driving gear 86. While the driving gear 86 is set at this initial position, the press lever 87 is held at a position (to be referred to as a non-push position hereinafter) where the press portion 107a opposes the portions (to be depressed) 11a of the slide levers 11 of the disk magazine 1 mounted on the magazine carrier 80 with a predetermined distance L (see FIG. 12A) being left therebetween.

With this arrangement, when the loading motor 85 is rotated in the forward direction, the rotation transmitting member 101 is rotated counterclockwise in FIGS. 12A to 12D. Consequently, as shown in FIG. 12B, the swing lever 124 is moved to the second position to cause the swing gear 126 to be meshed with the counterclockwise end portion of the toothed portion 86a of the driving gear 86 and to cause the swing gear 126 to rotate clockwise. As a result, the driving gear 86 is rotated counterclockwise. Since the press pin 121 of the driving gear 86 is moved counterclockwise, the press pin 121 urges the front edge 117a of the groove 117 of the control plate 112 substantially forward, thereby moving the control plate 112 and the press lever 87 forward.

The control plate 112 is urged forward by the press pin 121 to a position where the press pin 121 is positioned in front of the rotational center of the driving gear 86, i.e., the forward movement component becomes zero, as shown in FIG. 12C. Meanwhile, the press lever 87 is moved forward by a distance slightly larger than the distance L, so that the press portion 107a of the press lever 87 pushes a predetermined slide lever 11 of the disk magazine 1 by a predetermined amount, as shown in FIG. 12C. With this operation, the optical magnetic disk 8 corresponding to the pushed slide lever 11 is pushed out of the opening 2 of the disk magazine 1 toward the recording/reproducing portion 75 side.

The driving gear 86 is continuously rotated until the clockwise end portion of the toothed portion 86a is disengaged from the swing gear 126, and the non-toothed portion 122 opposes the swing gear 126. Since the movement of the press pin 121 during this period includes backward movement components, the press pin 121 urges the rear edge 117b of the groove 117 the control plate 112, i.e., the front edge of the rear piece 114 backward. Therefore, the control plate 112 and the press lever 87 are moved backward, and at the same time the press pin 121 is moved upward from the groove 117.

When the counterclockwise rotation of the driving gear 86 is stopped in this manner, the press pin 121 comes to a position substantially vertically symmetrical with the initial position. Consequently, the press lever 87 is returned to the non-push position. In addition, rotation of the loading motor 85 is stopped upon completion of transfer of the disk by means of the disk feed rollers 88 and 89.

Figure 13:
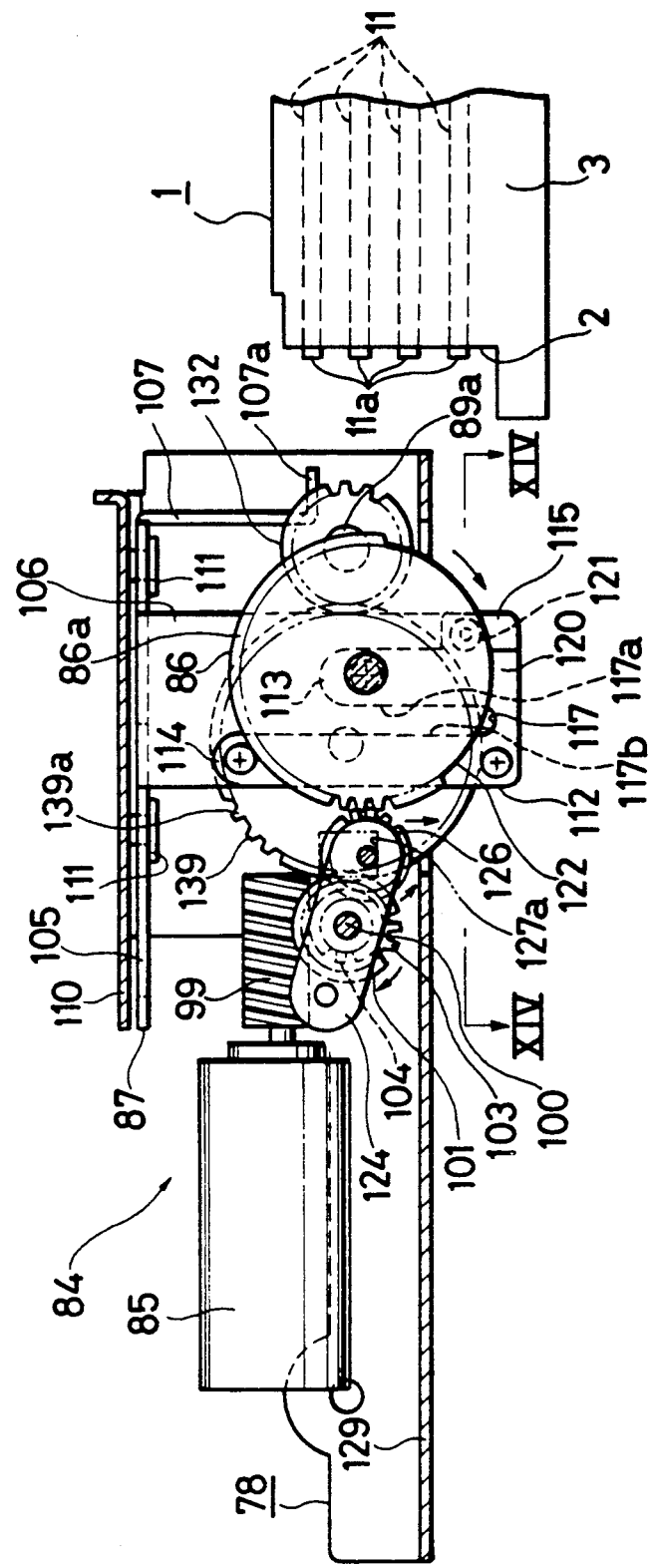
Figure 14A:
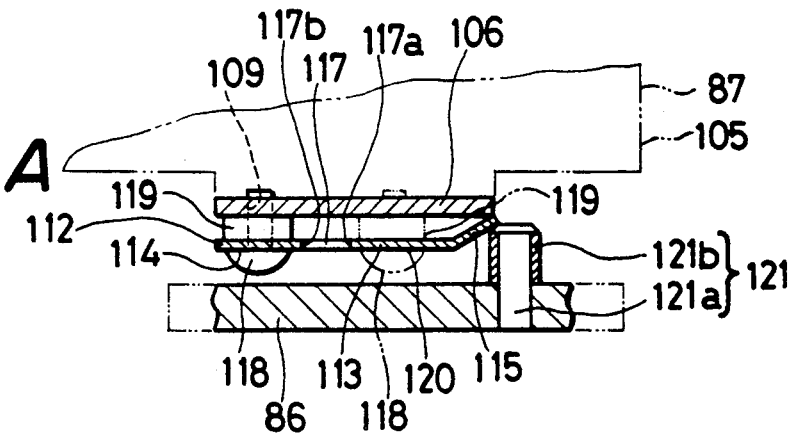
FIGS. 14A to 14C are enlarged sectional views taken along a line XIV—XIV in FIG. 3 and sequentially showing movement of a press pin and a leaf spring member when disk loading is performed.
Figure 14B:
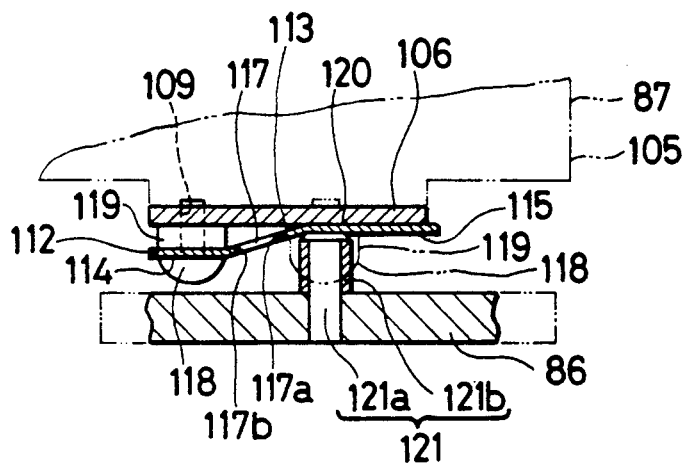
Figure 14C:
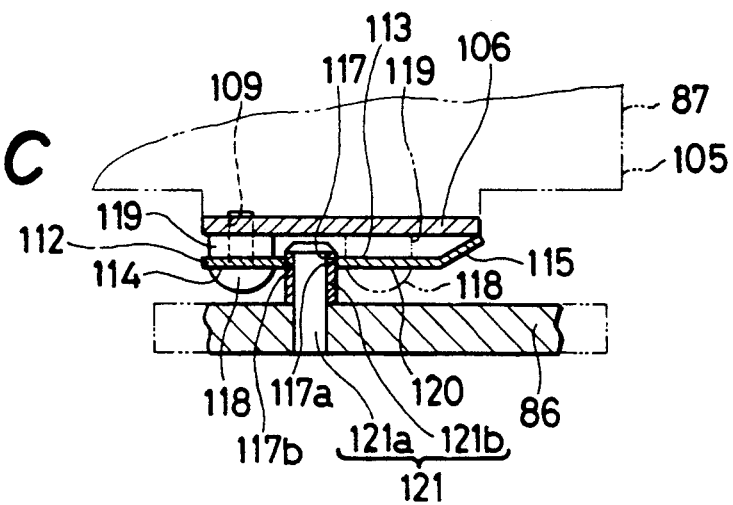

If the loading motor 85 is rotated in the reverse direction in this state, the rotation transmitting member 101 is rotated clockwise, and hence the swing lever 124 is moved to the first position to cause the swing gear 126 to be meshed with the clockwise end portion of the toothed portion 86a of the driving gear 86 and to rotate the swing gear 126 counterclockwise. As a result, the driving gear 86 is rotated clockwise. In this case, since the press pin 121 is not engaged with the groove 117 of the control plate 112, the press pin 121 is moved clockwise without moving the control plate 112 and the press lever 87. When the driving gear 86 makes a substantially half turn, the distal end of the press pin 121 is brought into contact with the guide piece 115 of the control plate 112 from substantially the front thereof, as shown in FIG. 14A. Consequently, as shown in FIGS. 13 and 14B, the press pin 121 rides on the left side surface of the flexible portion 120 of the control plate 112 and moves while bending the flexible portion 120 rightward. When the driving gear 86 returns to the initial position, the press pin 121 opposes the groove 117. As a result, the flexible portion 120 returns to its original position, and the press pin 121 is engaged with the lower end portion of the groove 117, as shown in FIG. 14C. At substantially the same time, since the non-toothed portion 122 of the driving gear 86 opposes the swing gear 126, the rotation of the driving gear 86 is stopped. With this operation, the disk push portion is restored to the state prior to loading, i.e., the state shown in FIG. 12A.

Reference numeral 128 denotes a support frame (see FIGS. 7 and 8) fixed to the upper surface of a bottom plate 129 of the disk lift member 78. The support frame 128 is constituted by left and right side walls 130 and 130', and a top plate 131 coupling the rear portions of the upper edges of the side walls 130 and 130', i.e., a member 131 supporting the clamper 79 so as to have a substantially U shape which is open downward in the forward/backward direction and is elongated in the right/left direction.

Reference symbol 89a denotes a shaft of the lower disk feed roller 89. The left and right end portions of the shaft 89a are rotatably supported by the front end portions of the side walls 130 and 130' of the support frame 128, while a gear 132 is fixed to a portion of the shaft 89 which protrudes from the left side wall 130 to the left.

As described above, the disk lift member 78 is supported by the mechanical chassis 76 so as to be vertically movable within the predetermined range, and is moved between an upper position (shown in FIG. 7) and a lower position slightly lower than the upper position. This movement is performed by sliders 133 (see FIG. 8) which are arranged on the mechanical chassis 76 so as to be moveable in the forward/backward direction.

Reference numerals 134 and 134' denote roller support arms which are pivotally supported by arm support shafts 135 and 135', respectively, which are fixed at positions near the front ends of the left and right side walls 130 and 130'. In addition, both the end portions of the shaft 88a of the upper disk feed roller 88 are rotatably supported by the pivot end portions of the roller support arms 134 and 134'. A gear 136 is fixed to a portion of the shaft 88a which protrudes to the left from the roller support arm 134 on the left side.

Reference numeral 137 denotes a shaft protruding to the left from substantially the middle portion of the left roller support arm 134. A direction change gear 138 is rotatably supported by the shaft 137. The direction change gear 138 is normally meshed with the gear 136.

Reference numeral 139 denotes a reduction gear having a relatively large diameter. A large-diameter portion 139a and a small-diameter portion 139b are integrally formed and are rotatably supported by a portion of the arm support shaft 135 on the left side which protrudes from the roller support arm 134 to the left. The large-diameter gear 103 of the rotation transmitting member 101 is meshed with the large-diameter portion 139a substantially from behind, and the gear 132 fixed to the shaft 89a of the lower disk feed roller 89 is meshed with the large-diameter portion 139a substantially from the front thereof. The direction change gear 138 is normally meshed with the small-diameter portion 139b.

The roller support arms 134 and 134' supporting the shaft 88a of the upper disk feed roller 88 are normally biased by the elastic force of an elastic means (not shown) so as to pivot clockwise in FIG. 7. While the disk lift member 78 is set at the upper position, the disk feed roller 88 is in elastic contact with the lower disk feed roller 89 substantially from above, as shown in FIG. 7. When the disk lift member 78 is moved to the lower position, since the roller support arms 134 and 134' are pivoted counterclockwise in FIG. 7 by the cam sliders 133 and 133', the upper disk feed roller 88 is moved to a position indicated by an alternate long and two short dashed line in FIG. 7, i.e., a position which is separated upward from the lower disk feed roller 89.

When the loading motor 85 is rotated in the forward direction, the rotation transmitting member 101 is rotated counterclockwise, and hence the reduction gear 139 is rotated clockwise. As a result, the gear 132 is rotated counterclockwise, and hence the lower disk feed roller 89 is rotated counterclockwise. In addition, since the direction change gear 138 and the gear 136 are respectively rotated counterclockwise and clockwise, the upper disk feed roller 88 is rotated clockwise.

When the loading motor 85 is rotated in the reverse direction, the upper and lower disk feed rollers 88 and 89 are respectively rotated counterclockwise and clockwise.

With this arrangement, while the disk lift member 78 is set at the upper position, the upper and lower disk feed rollers 88 and 89 are in elastic contact with each other. If the loading motor 85 is rotated in this state, the two disk feed rollers 88 and 89 are rotated in the opposite directions in elastic contact with each other. Therefore, if the optical magnetic disk 8 is inserted in a contact portion between the disk feed rollers 88 and 89 from the front thereof as indicated by a solid line in FIG. 7 while the loading motor 85 is rotated in the forward direction, the disk feed rollers 88 and 89 transfer the optical magnetic disk 8 backward. If the loading motor 85 is rotated in the reverse direction while part of the optical magnetic disk 8 is clamped between the disk feed rollers 88 and 89, the optical magnetic disk 8 is transferred forward.

Loading and unloading of the optical magnetic disk 8 is performed by the disk loading apparatus 84 having the above-described arrangement in the following manner.

Note that the following description is based on a state wherein the magazine carrier 80 is set at the initial position, i.e., the position where an optical magnetic disk is fed to the first recording/reproducing drive unit 75₁.

In disk loading, the loading motor 85 is rotated in the forward direction to rotate the upper and lower disk feed rollers 88 and 89 clockwise and counterclockwise, respectively, while they are in elastic contact with each other. At the same time, the press lever 87 is moved forward to urge the slide lever 11. As a result, the optical magnetic disk 8 is pushed out of the disk magazine 1 to be fed between the disk feed rollers 88 and 89. With this operation, the optical magnetic disk 8 is transferred by the disk feed roller 88 and 89 to a disk mounting portion (not shown) of the disk lift member 78, as indicated by an alternate long and two short dashed line in FIG. 7 or an alternate long and short dashed line in FIG. 8. Thereafter, the rotation of the loading motor 85 is stopped.

When the feed operation of the optical magnetic disk 8 to the disk lift member 78 is completed, the cam sliders 133 are moved to move the disk lift member 78 to the lower position. At this time, the upper disk feed roller 88 is separated upward from the lower disk feed roller 89. In addition, the optical magnetic disk 8 is mounted on the turntable 7 as indicated by an alternate long and short dashed line in FIG. 7 slightly before the disk lift member 78 reaches the lower position. Subsequently, the clamper 79 clamps the central portion of the optical magnetic disk 8 and is drawn to the turntable 77 by suction. As a result, the optical magnetic disk 8 is mounted on the turntable 77. Although part of the optical magnetic disk 8 is positioned between the two disk feed rollers 88 and 89 in this state, both the disk feed rollers 88 and 89 are separated from the optical magnetic disk 8.

In unloading, the magazine carrier 80 is moved to a position to oppose the first recording/reproducing drive unit 75₁, and at the same time the cam sliders 133 are moved to move the disk lift member 78 to the upper position. As a result, the optical magnetic disk 8 is separated upward from the turntable 77, and the clamper 79 is separated upward from the optical magnetic disk 8. At the same time, the lower disk feed roller 89 is brought into contact with the optical magnetic disk 8 from below, and the upper disk feed roller 88 is brought into elastic contact with the lower disk feed roller 89 through the optical magnetic disk 8.

The loading motor 85 is rotated in the reverse direction in this state. Consequently, the upper and lower disk feed rollers 88 and 89 are rotated counterclockwise and clockwise, respectively. As a result, the optical magnetic disk 8 is transferred forward and is returned to a predetermined disk housing space 7 of the disk magazine 1. At the same time, the driving gear 86 is returned to the initial position, and its press pin 121 is engaged with the lower end of the groove 117 of the control plate 112.

Figure 15:
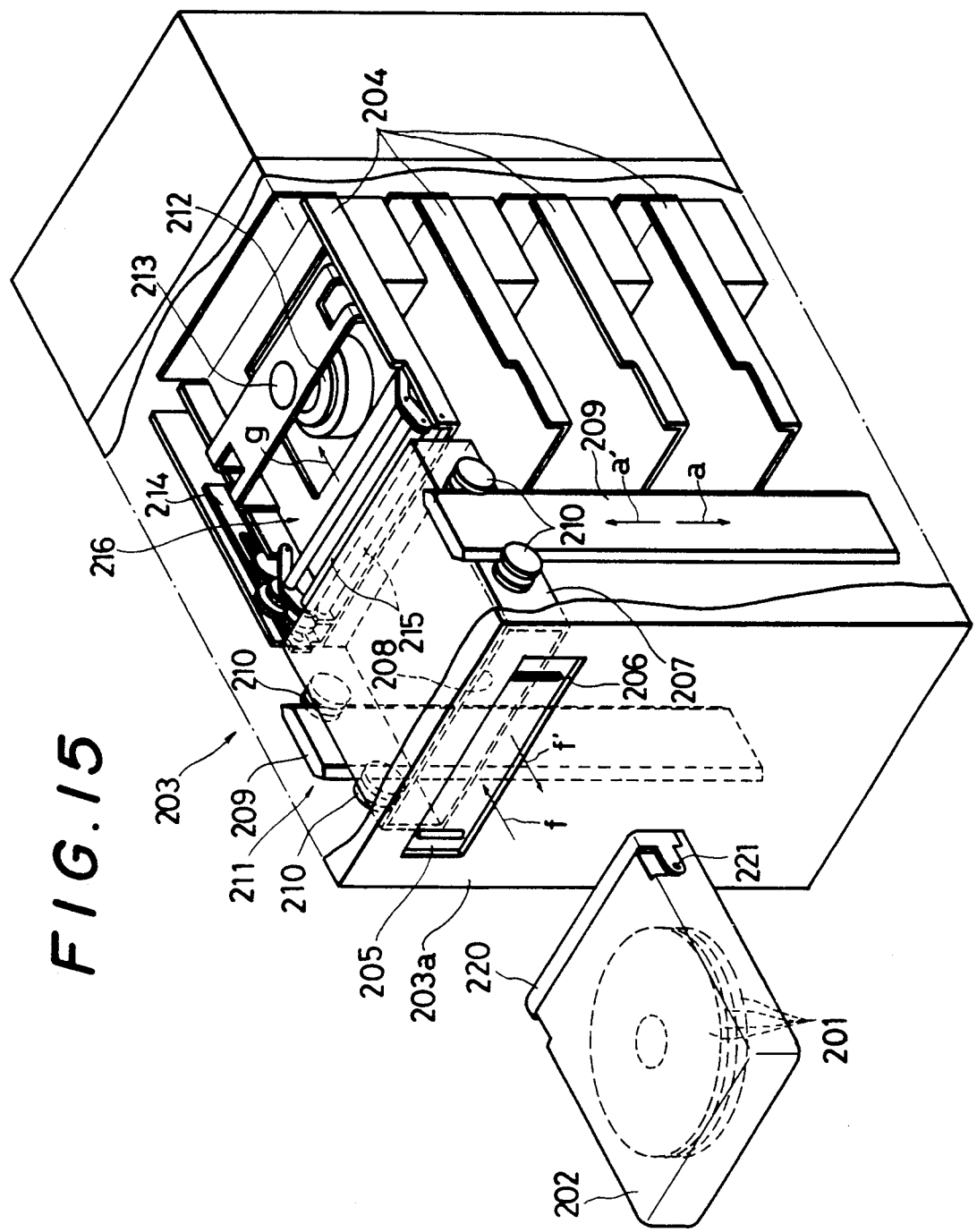
FIG. 15 is a perspective view showing a modification of the disk loading apparatus.
Figure 16:
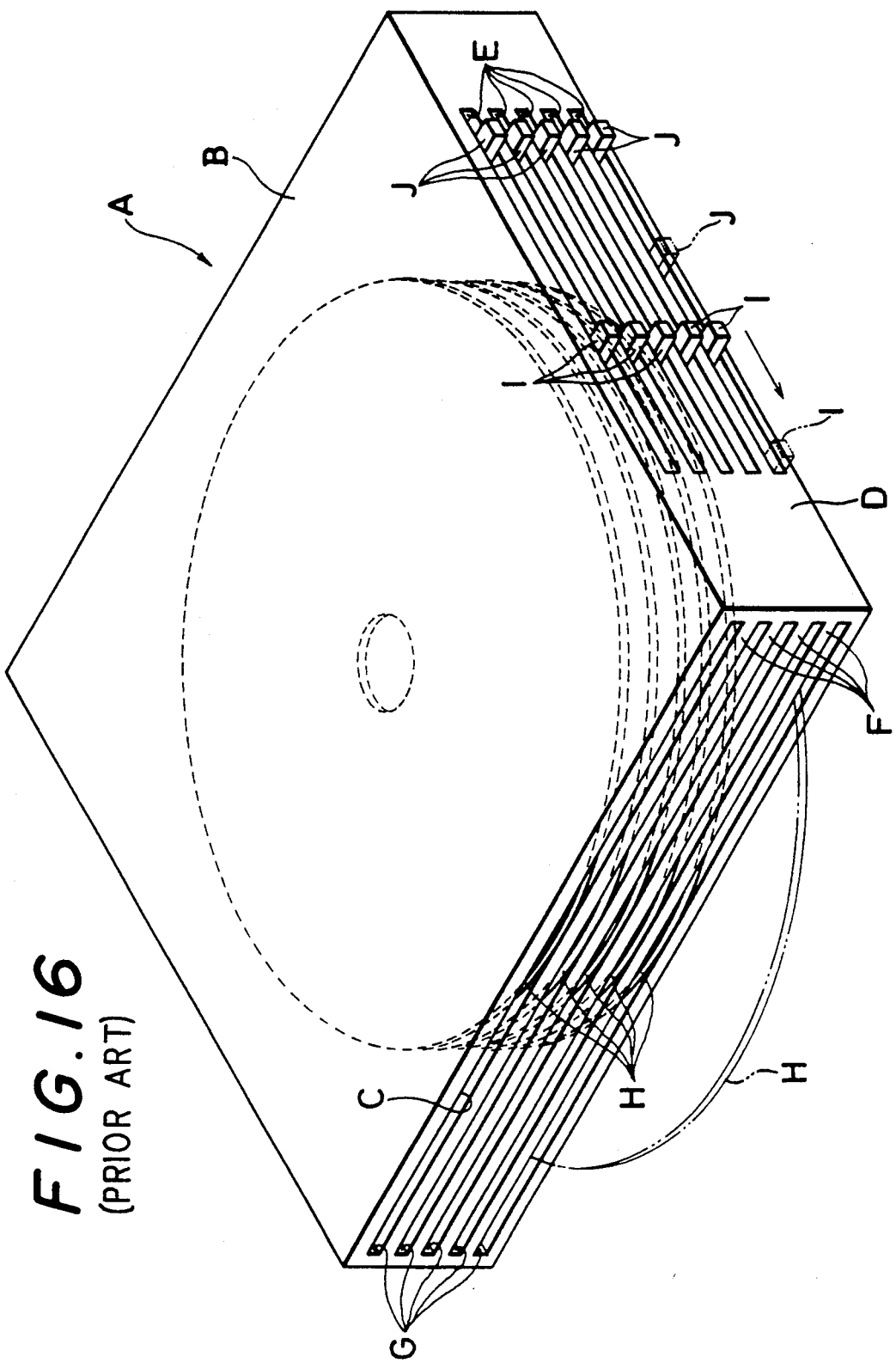
FIG. 16 is a perspective view showing a conventional disk magazine.

A modification of the disk loading device will be described below with reference to FIG. 15.

Optical magnetic disks 201 are vertically stacked in a disk magazine 202. A lid 220 for opening/closing a disk ejecting opening is pivotally attached to the disk magazine 202 with a support pin 211 serving as the pivot center.

A plurality of recording/reproducing drive units 204 are vertically stacked in a recording/reproducing apparatus 203. A magazine insertion port 206 having an opening/closing lid 205 is formed in a front panel 203a of the recording/reproducing apparatus 203. A magazine carrier 207 is arranged in the recording/reproducing apparatus 203 between the front panel 203a and the plurality of recording/reproducing disk drive units 204. A magazine insertion space 208 is formed in the magazine carrier 207 with its front and rear ends being open. The magazine carrier 207 is designed to be transferred along the plurality of recording/reproducing drive units 204 in the directions indicated by arrows a and a', i.e., vertically by a transfer mechanism 211 comprising, e.g., a guide rail 209, a guide roller 210, a driving belt, and a motor (none of which are shown). Each of the plurality of recording/reproducing drive units 204 comprises, e.g., a disk table 212 to be driven by a driving motor (not shown), a disk chuck 213 which can be freely raised and lowered with respect to the disk table 212, and a recording/reproducing head (not shown). In addition, each unit 204 comprises, e.g., a disk loading apparatus 216 constituted by, e.g., a press lever 214 and a plurality of feed rollers 215 as a disk transfer means.

Note that the number of optical magnetic disks 201 to be housed in the disk magazine 202 is preferably set to be equal to or an integer multiple of that of recording/reproducing drive units 204, or to be equal to the number larger by one than that of the units 204.

Loading and unloading of the optical magnetic disks 201 are performed by the disk loading apparatuses 216 in the following manner.

In disk loading, the disk magazine 202 is inserted in the magazine carrier 207 through the magazine insertion port 206 of the recording/reproducing apparatus in the direction indicated by an arrow f, and is attached to the recording/reproducing apparatus while the disk magazine 202 is inserted in the magazine insertion space 208.

In this case, the lid 220 can be opened upon insertion of the disk magazine 202 into the magazine carrier 207 in the direction indicated by the arrow f.

Upon attachment of the disk magazine 202 to the magazine carrier 207, the magazine carrier 207 is transferred along the guide rail 9 in the direction indicated by the arrow a by the transfer mechanism 211. The disk magazine 202 is transferred along the plurality of recording/reproducing drive units 204 in the direction indicated by the arrow a by the magazine carrier 207.

Upon transfer of the disk magazine 202, the plurality of optical magnetic disks 201 housed in the disk magazine 202 are sequentially and automatically transferred to loading and unloading positions respectively opposing the disk loading apparatuses of the recording/reproducing drive units 204 in a designated order.

In this case, the magazine carrier 207 is temporarily stopped every time a designated optical magnetic disk 201 is transferred to a designated loading or unloading position.

While the magazine carrier 207 is temporarily stopped, the press lever 214 of each disk loading apparatus 216 pushes a portion (to be pushed) of a designated disk push means (not shown) in the disk magazine 202. As a result, the designated optical magnetic disk 201 is pushed out of the disk magazine 202 by the disk push means. The pushed out optical magnetic disk 202 is then automatically fed in the direction indicated by an arrow g by disk feed rollers 215 of a corresponding disk loading apparatus. After the optical magnetic disk 201 is automatically loaded on the disk table 212 of the designated recording/reproducing drive unit 204, it is fixed on the disk table 212 by a corresponding disk chuck 213.

By repeating the above-described operation, the plurality of optical magnetic disks 201 housed in the disk magazine 202 are sequentially and automatically loaded in the plurality of recording/reproducing drive units 204 in the designated order.

After the above loading operation, the plurality of optical magnetic disks 201 are simultaneously rotated by the disk tables 212 of the recording/reproducing drive units 204. As a result, one data is separately and simultaneously recorded/reproduced in/from the plurality of optical magnetic disks 201 by the plurality of recording/reproducing heads of the recording/reproducing drive units 204, thereby performing recording/reproducing at high transfer rate in a high signal band.

After the above-described recording/reproducing operation, if the above-described loading operation is reversed, the plurality of optical magnetic disks 201 loaded in the plurality of recording/reproducing drive units 204 can be sequentially and automatically unloaded and housed in the disk magazine 202 in a designated order.

In this case, if the disk magazine 202 is taken out from the magazine carrier 207 in the direction indicated by an arrow f' upon the above operation, one set of optical magnetic disks 201 can be stocked while they are housed in one disk magazine 202 with the lid 220 closing the disk magazine 202.

We claim:

1. An apparatus for recording information on and/or reproducing information from a plurality of disks removed from a disk magazine, said magazine having disk pushing means for partially ejecting disks thereout through an opening, comprising:

a plurality of recording and/or reproducing mechanisms arranged stacked, each mechanism having means for actuating said disk pushing means mounted therewith to partially eject disks from said magazine, said means for actuating driven by a motor, each mechanism having a disk loading device mounted therewith driven by said motor and rotated in normal and reverse directions when said disk is loaded on and unloaded from said mechanism, respectively, said disk loading device arranged to engage one of said disks partially ejected from said magazine and load said disk onto said mechanism and arrange to transfer said disk from said mechanism back into said magazine during unloading; and means for vertically positioning said magazine at each respective mechanism for delivering a disk;

wherein said means for actuating comprises a driving gear rotated in both the normal and reverse directions by said motor, a press pin projecting from said driving gear, a pressing member movable within a predetermined range, driven by said press pin, and capable of pressing a pressed portion of the disk pushing means of said magazine by a pressing portion of the pressing member, means for operatively connecting said press pin and disconnecting said press pin from said pressing member.

2. The apparatus according to claim 1, wherein for disk magazines providing a pivotable lid covering said opening, said apparatus comprises a magazine carrier having lid opening means arranged thereon for opening said lid upon insertion of said magazine onto said carrier, said carrier and said magazine translatable vertically to front each of said mechanisms.

3. An arrangement according to claim 2 wherein each said disk loading device comprises two disk feed rollers driven by said motor, said rollers arranged for said disk to be loaded or unloaded from said recording and/or reproducing mechanism by being pinched between said rollers, and each said disk loading device having gear means for causing said two rollers to roll in a first combination of opposite rotational directions corresponding to a normal rotation of said motor, and said two rollers to roll in a second combination of opposite rotational directions corresponding to said reverse rotation of said motor.

4. An arrangement according to claim 1, wherein each said disk pushing means pushes out said respective disks along a defined horizontal direction, and a respective disk loading device translates said disks along said same defined horizontal direction to said recording and/or reproducing mechanism.

5. The apparatus according to claim 1, wherein each disk loading device comprises two disk feed rollers driven by said motor, said rollers arranged for said disk to be loaded or unloaded from said recording and/or reproducing mechanism by being pinched between said rollers, and gear means for causing said two rollers to roll on a first combination of opposite rotational directions corresponding to a normal rotation of said motor, and for causing said two rollers to roll in a second combination of opposite rotational directions corresponding to said reverse rotation of said motor.

6. A disk loading device combined with a disk magazine, comprising:

a disk magazine (1) having a plurality of disks (8) for recording and/or reproducing information, which are accommodated in a vertical direction and in such a way as to be in layers and spaced away from one another, an opening (2) for taking out the disks (8) in one side thereof, a pivoted lid (4) for closing said opening (2), and a plurality of disk pushing means (6) for pushing out said respective disks (8) accommodated in said disk magazine (1) by a predetermined projection amount through said opening (2) by means of pressing a pressed portion (11a) thereof, which is provided near said opening (2); and an apparatus (72) for recording information on and/or reproducing information from each of the selected disks taken out from said plurality of disks (8) which are accommodated in said disk magazine (1) mounted thereon;

wherein provided in said apparatus (72) is a disk loading device (84) which comprises a lid operating mechanism (83); a motor (85) rotated in normal and reverse directions when said disk (8) is loaded on and unloaded from said apparatus (72), respectively; a driving gear (86) rotated in both the normal and reverse directions by said motor (85); an interlock portion (121) projecting from said driving gear (86); a pressing member (87) movable within a predetermined range and capable of pressing said pressed portion (11a) of the disk pushing means (6) by a pressing portion (107a) provided therein; means (112) for connecting said interlock portion (121) of the driving gear (86) to, and disconnect said interlock portion (12) from said pressing member (87); and a disk transfer means (88, 89) for loading the disk (8) pushed out of said disk magazine (1) by said disk pushing means (6), to a recording and/or reproducing mechanism (75) due to normal rotation of said motor (85), and unloading the disk (8) from said recording and/or reproducing mechanism (75) due to reverse rotation of said motor (85).

7. The apparatus according to claim 2, wherein said magazine carrier provides a pinion engageable to said lid and translatable in a direction of insertion of said magazine onto said magazine carrier, said pinion engaged to a stationary rack with respect to said magazine carrier, insertion of said magazine onto said magazine carrier causing said pinion to progress along said rack and pivot said lid.

8. The apparatus according to claim 7, wherein for magazines having a lid latch, said magazine carrier further comprises a delatching lever pressable against said latch upon insertion of said magazine onto said magazine carrier.

9. An apparatus for recording information on and/or reproducing information from a plurality of disks removed from a disk magazine, said magazine having disk pushing means for partially ejecting disks thereout through an opening, comprising:

a plurality of recording and/or reproducing mechanisms arranged stacked, each mechanism having means for actuating said disk pushing means mounted therewith to partially eject disks from said magazine, said means for actuating driven by a motor, each mechanism having a disk loading device mounted therewith driven by said motor and rotated in normal and reverse directions when said disk is loaded on and unloaded from said mechanism, respectively, said disk loading device arranged to engage one of said disks partially ejected from said magazine and load said disk onto said mechanism and arrange to transfer said disk from said mechanism beck into said magazine during unloading; and means for vertically positioning said magazine at each respective mechanism for delivering a disk; and wherein said means for vertically positioning said magazine comprises:
a positioning motor;
a transmission means;
a first pulley and a second pulley, said pulleys spaced apart to span said plurality of recording and/or reproducing mechanisms;
a traction loop wrapped around said first and second pulleys;
a magazine carrier for holding said magazine guided for vertical movement with respect to said plurality of recording and/or reproducing mechanisms and connected to said traction loop, said transmission means for receiving rotative power from said positioning motor and converting the rotative power to translate said traction loop to vertically position said magazine carrier.

10. An apparatus according to claim 9, wherein said means for vertically positioning said magazine also positions said magazine with respect to aligning said means for actuating said disk pushing means to a select disk pushing means corresponding to the disk to be loaded or unloaded from/to the magazine.

11. An arrangement according to claim 9, wherein for disk magazines providing a pivotable lid covering said opening, said magazine carrier having a receiving surface for holding said magazine thereon and lid opening means, wherein said magazine carrier has a framework and said receiving surface is slidable with respect to said framework and said lid opening means provides a pinion engageable to said lid and connected to said receiving surface of said magazine, said pinion enmeshed with a rack that is stationary with respect to said framework, insertion of said magazine onto said receiving surface and sliding of said receiving surface and magazine together causing said pinion to progress along said rack and pivot said lid to an open position.

12. An arrangement according to claim 11, wherein said magazine comprises a lid latch for releasably holding said lid in a closed condition to said housing, and said magazine carrier comprises a delatching lever arranged to engage and unlatch said latch upon insertion of said magazine onto said magazine carrier.

13. An arrangement for selectively recording or reproducing information onto or from a plurality of disks, comprising:

a disk magazine having a housing holding a plurality of disks therein, said disks for recording and/or reproducing information, said disks stacked in a vertical direction and in such a way as to be in layers and spaced away from one another, an opening at one side of said housing for taking out the disks, and a plurality of disk pushing means for pushing out said respective disks accommodated in said disk magazine by a predetermined projection amount through said opening by means of pressing a pressed portion of said disk pushing means; and an apparatus for recording information on and/or reproducing information from each of the selected disks taken out from said plurality of disks which are accommodated in said disk magazine mounted onto said apparatus;

wherein said apparatus provides:
a plurality of recording and/or reproducing mechanisms each having a disk loading device mounted therewith, each disk loading device having:
a motor rotated in normal and reverse directions when said disk is loaded on and unloaded from said recording and/or reproducing device, respectively;
a driving gear rotated in both the normal and reverse directions by said motor;
an interlock means projecting from said driving gear;
a pressing member moveable within a predetermined range and capable of pressing said pressed portion of the disk pushing means by a pressing portion of the pressing member;
means for connecting said interlock means of the driving gear to, and disconnect said interlock means form, said pressing member for imparting movement by said driving gear; and
a disk transfer means for loading the disk pushed out of said disk magazine by said disk pushing means, to said recording and/or a reproducing mechanism due to normal rotation of said motor, and unloading the disk from said recording and-/or reproducing mechanism due to reverse rotation of said motor.

14. An arrangement according to claim 13 wherein at least one of said disk transfer means comprises two disk feed rollers driven by said motor, said rollers arranged for said disk to be loaded or unloaded from said recording and/or reproducing mechanism by being pinched between said rollers, and said disk transfer means having gear means for causing said two rollers to roll in a first combination of opposite rotational directions corresponding to a normal rotation of said motor, and said two rollers to roll in a second combination of opposite rotational directions corresponding to said reverse rotation of said motor.

* * * * *